US006188957B1

United States Patent
Bechtolsheim et al.

(10) Patent No.: US 6,188,957 B1
(45) Date of Patent: Feb. 13, 2001

(54) METHOD AND SYSTEM FOR PROVIDING BICYCLE INFORMATION WITH A NAVIGATION SYSTEM

(75) Inventors: Stephan V. Bechtolsheim, Buffalo Grove; Lawrence M. Kaplan, Northbrook; Frank J. Kozak, Naperville, all of IL (US)

(73) Assignee: Navigation Technologies Corporation, Rosemont, IL (US)

( * ) Notice: Under 35 U.S.C. 154(b), the term of this patent shall be extended for 0 days.

(21) Appl. No.: 09/411,570

(22) Filed: Oct. 4, 1999

(51) Int. Cl.[7] .................................................. G06F 165/00
(52) U.S. Cl. ............................... 701/209; 701/117; 701/1; 701/208; 340/903
(58) Field of Search .................................... 701/209, 208, 701/200, 1, 117; 340/903

(56) References Cited

U.S. PATENT DOCUMENTS

| 3,925,641 | | 12/1975 | Kashio . | |
|---|---|---|---|---|
| 5,559,707 | | 9/1996 | DeLorme et al. . | |
| 5,648,768 | | 7/1997 | Bouve . | |
| 5,731,978 | * | 3/1998 | Tamai et al. .......................... | 701/201 |
| 5,758,313 | | 5/1998 | Shah et al. . | |
| 5,877,708 | * | 3/1999 | Hijikata ................................ | 340/995 |
| 5,974,419 | * | 10/1999 | Ashby .................................. | 707/100 |
| 6,035,253 | * | 3/2000 | Hayashi et al. ...................... | 701/211 |
| 6,049,753 | * | 4/2000 | Nimura ................................ | 701/201 |

* cited by examiner

Primary Examiner—William A. Cuchlinski, Jr.
Assistant Examiner—Olga Hernandez
(74) Attorney, Agent, or Firm—Frank J. Kozak; Lawrence M. Kaplan

(57) ABSTRACT

A navigation system feature that provides information about bicycle traffic and/or travel by bicycle. According to one aspect of the disclosed subject matter, a navigation system uses a geographic database to provide navigation-related features, such as route calculation and route guidance, for both motorized vehicles and bicycles. When providing navigation-related features for travel by bicycle, the navigation system evaluates the road segments for suitability for travel by bicycle. According to another aspect of the disclosed subject matter, a navigation system in a motorized vehicle provides warnings about bicycle traffic around the motorized vehicle as the motorized vehicle is being driven. Using a geographic database that includes data about the locations of bicycle lanes and paths, the navigation system provides warnings as the motorized vehicle approaches a bicycle lane or path or otherwise is in proximity to a bicycle lane or path. According to another aspect, information about bicycle lanes is included in a geographic database used by a navigation system. The geographic database includes data that represent roads used by motorized vehicles. The geographic database also includes data about bicycle lanes that are located adjacent to lanes of represented roads used by motorized vehicles. The geographic database also includes data about bicycle lanes that are located separately from lanes of roads used by motorized vehicles. According to another aspect, the navigation system receives transmissions from bicycles, motorcycles, or pedestrians located in a vicinity of the vehicle and provides warnings to the vehicle driver, as appropriate.

33 Claims, 15 Drawing Sheets

FIG. 2

ROUTING 236

SEGMENT DATA ENTITY 222

| SEG ID 222(1) | CLASSIFICATION 222(4) |

PERMITTED TRAVEL DIRECTION 222(2)

| | | |
|---|---|---|
| CARS | L/R | R/L | ← 222(2)(1)
| TRUCKS | L/R | R/L | ← 222(2)(2)
| BICYCLES | L/R | R/L | ← 222(2)(3)
| PEDESTRIAN | L/R | R/L | ← 222(2)(4)

| BICYCLE LANE/PATH LOCATION 222(7) | L/R | R/L |

| other data 222(6) | RANK 222(5) | SPEED LIMIT 222(3) |

ENDPOINTS 222(8)

(left endpoint)
- NODE ID 222(8)(1)(1)
- VALID SUCCESSORS 222(8)(1)(2)
- INVALID SUCCESSORS 222(8)(1)(3)

(right endpoint)
- NODE ID 222(8)(2)(1)
- VALID SUCCESSORS 222(8)(2)(2)
- INVALID SUCCESSORS 222(8)(2)(3)

NODE DATA ENTITY 223(1)
- COORDINATES 223(1)(1)
  - LATITUDE
  - LONGITUDE
- other data 223(1)(4)

NODE DATA ENTITY 223(2)
- COORDINATES 223(2)(1)
  - LATITUDE
  - LONGITUDE
- other data 223(2)(4)

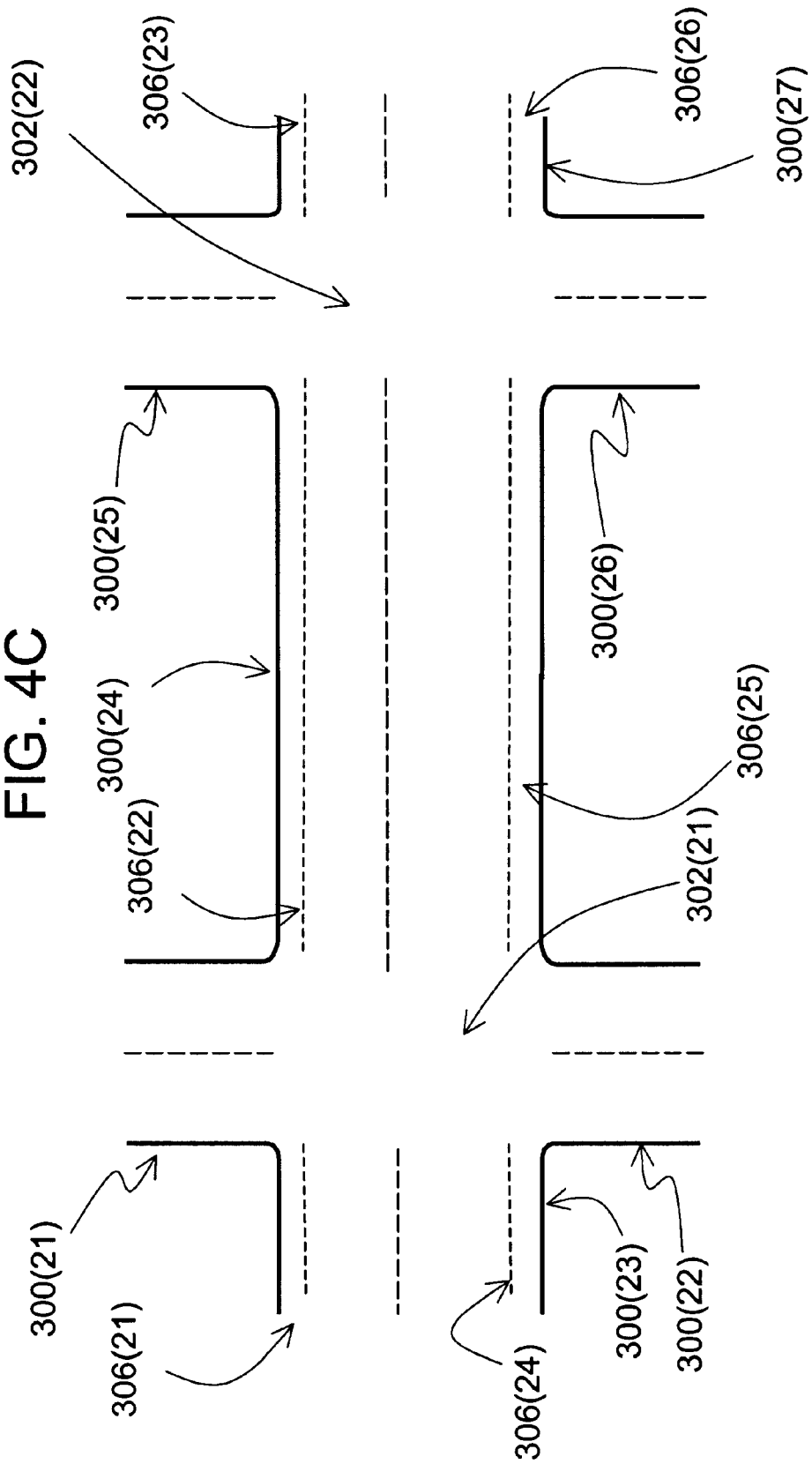

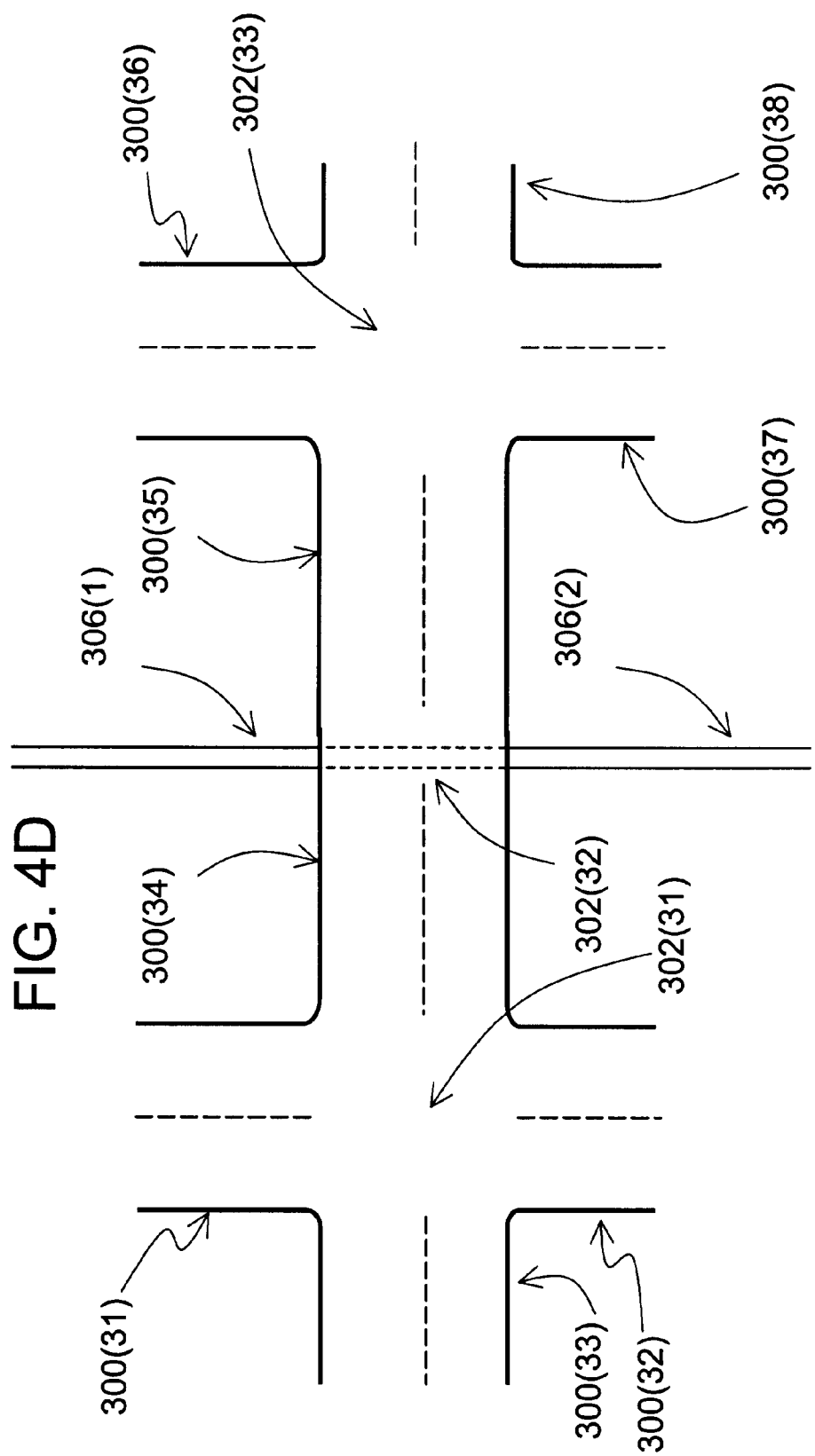

FIG. 9
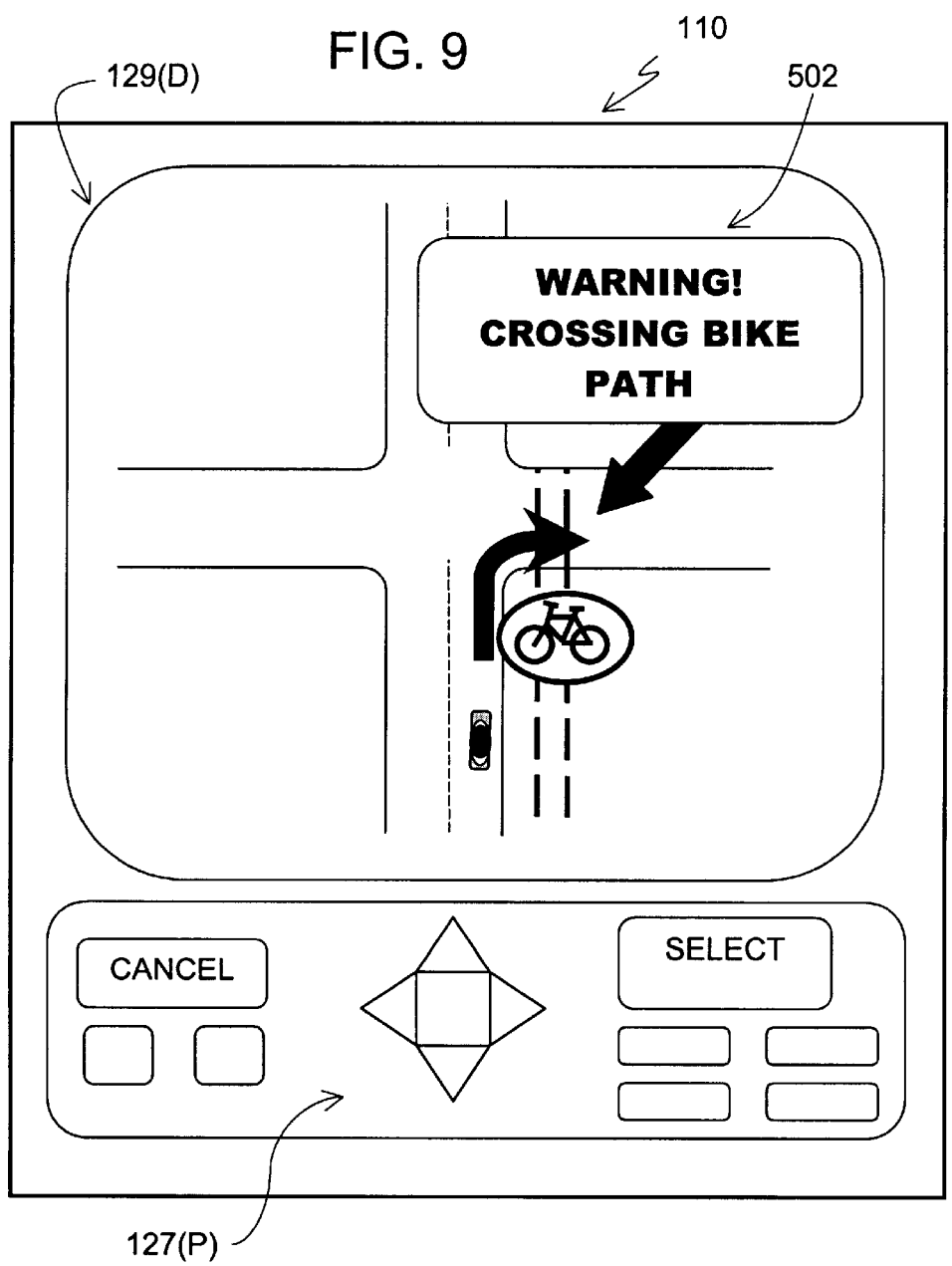
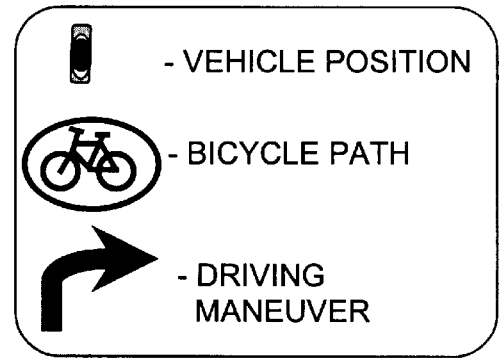

FIG. 11
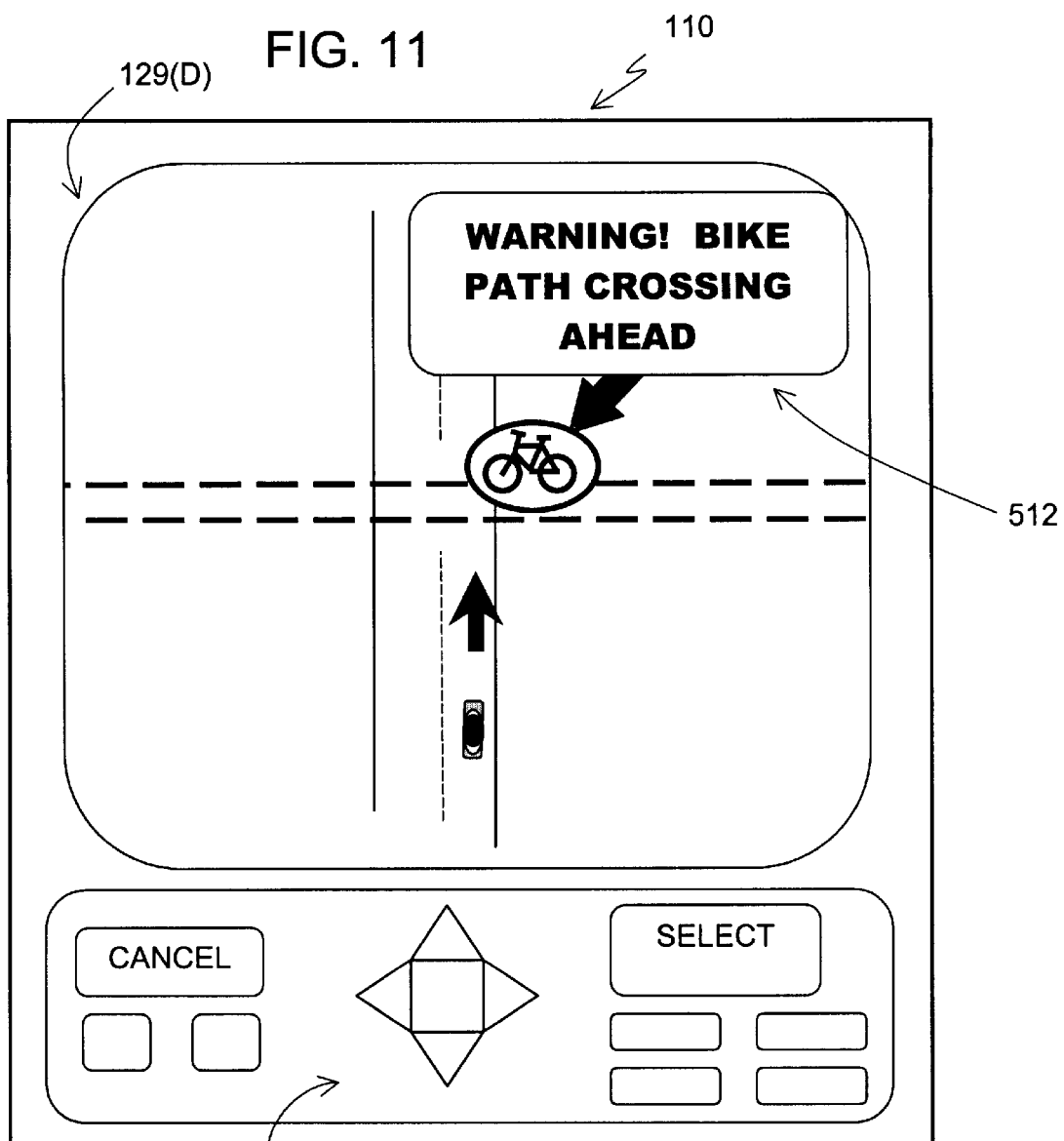
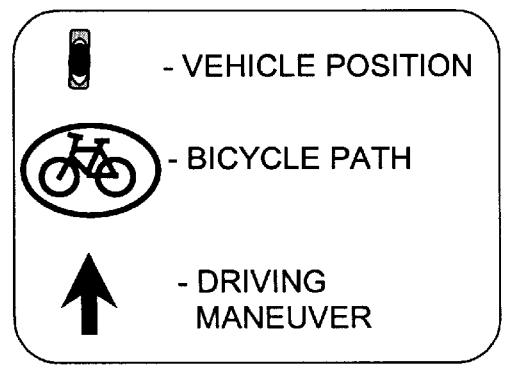

FIG. 13
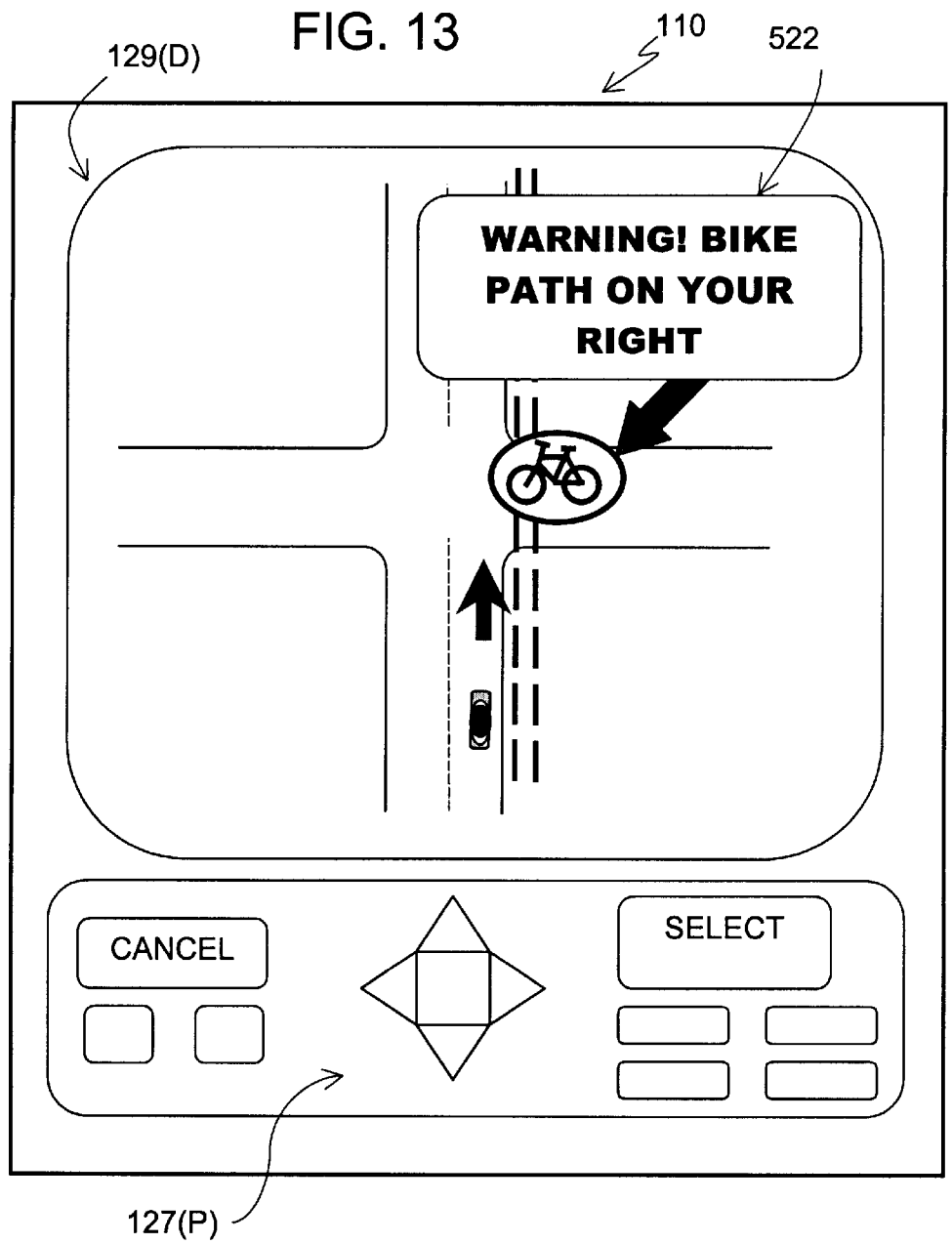
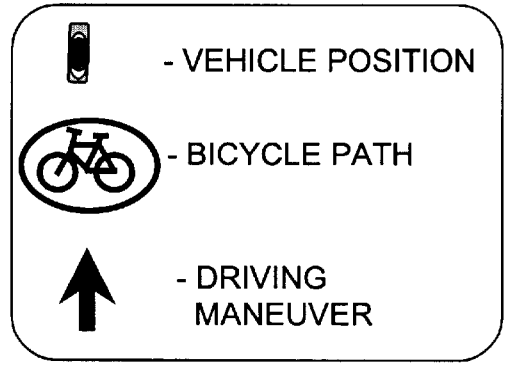

METHOD AND SYSTEM FOR PROVIDING BICYCLE INFORMATION WITH A NAVIGATION SYSTEM

BACKGROUND OF THE INVENTION

The present invention relates to navigation systems that use geographic databases and more particularly, the present invention relates to a feature in a navigation system wherein a navigation system user is able to obtain information about actual and/or potential bicycle traffic and/or bicycle travel.

Navigation systems are available that provide end users with various navigation-related features. Some navigation systems are installed in vehicles and are able to provide end users of the navigation systems (such as the drivers of the vehicles in which the navigation systems are installed) with various useful features associated with driving the vehicles. For example, some navigation systems are able to determine an optimum route to travel by roads between locations in a geographic region. Using input from the end user, and optionally from equipment that can determine one's physical location (such as a GPS system), a navigation system can examine various routes between two locations to determine an optimum route to travel from a starting location to a destination location in a geographic region. The navigation system may then provide the end user with information about the optimum route in the form of guidance that identifies the driving maneuvers required to be taken by the end user to travel from the starting location to the destination location. The guidance may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, speed limits along the roads, street names of the various roads, address ranges along the roads, and so on.

Although navigation systems provide many important features, there continues to be room for improvements. One area in which there is room for improvement relates to providing guidance about and for non-motorized vehicles, in particular bicycles. For example, some persons may want to enjoy the features of a navigation system, such as route calculation and guidance, for travel by bicycle instead of by car. Another area in which there is room for improvement relates to safety considerations. When motorized vehicles are being driven in areas in which there are also bicycle lanes or bicycle paths, it would be helpful if the vehicle driver could be provided with warnings or other guidance about actual and/or potential bicycle traffic around the vehicle.

SUMMARY OF THE INVENTION

To address these and other objectives, the present invention comprises a feature for a navigation system that provides information about bicycle traffic and/or travel by bicycle. According to a first aspect of the disclosed subject matter, a navigation system uses a geographic database to provide navigation-related features, such as route calculation and route guidance, for both motorized vehicles and bicycles. When providing navigation-related features for travel by bicycle, the navigation system evaluates the road segments for suitability for travel by bicycle.

According to another aspect of the disclosed subject matter, a navigation system in a motorized vehicle provides warnings about potential bicycle traffic around the motorized vehicle as the motorized vehicle is being driven. Using a geographic database that includes data about the locations of bicycle lanes and paths, the navigation system provides warnings as the motorized vehicle approaches a bicycle lane or path or otherwise is in proximity to a bicycle lane or path.

The aforementioned features are enabled by another aspect of the disclosed subject matter. According to this latter aspect, information about bicycle lanes is included in a geographic database used by a navigation system. The geographic database includes data that represent roads used by motorized vehicles. The geographic database also includes data about bicycle lanes that are located adjacent to lanes of represented roads used by motorized vehicles. The geographic database also includes data about bicycle lanes that are located separately from lanes of roads used by motorized vehicles.

According to yet another aspect of the disclosed subject matter, a receiver in a motorized vehicle receives signals indicating actual bicycle traffic around the motorized vehicle. The receiver may be included as part of a navigation system installed in the vehicle. Bicycles are equipped with transmitters that send signals indicating their presence and, optionally, their location. The signals sent by bicycles are received in the receiver. The signals received in the vehicle are the signals sent by the bicycles equipped with transmitters or are derived from the signals sent by the bicycles equipped with transmitters. The navigation system provides warnings to the driver of the motorized vehicle as the motorized vehicle approaches the location of the bicycle from which the signals were transmitted.

For purposes of this disclosure, a "navigation system" is understood to mean a navigation system installed in a vehicle (i.e., an in-vehicle navigation system). A "navigation system" is also understood to mean any software application installed on a computer platform that provides navigation-related features and uses geographic data, including applications that are installed on personal computers, networks, portable electronic devices, and so on. In addition, for purposes of this specification, the terms "bicycle lane" and "bicycle path" will be used interchangeably to mean a road or portion thereof designated for use by bicycles.

BRIEF DESCRIPTION OF THE DRAWINGS

FIG. 2 is a block diagram illustrating components of a road segment data entity included in the geographic database of FIG. 1, wherein the road segment data entity includes bicycle data according to a first embodiment.

FIGS. 4A–4D are illustrations of several different road configurations that include bicycle paths and that are represented in the geographic database of FIG. 1 using road segment data entities like the one depicted in FIG. 2.

FIG. 9 illustrates the display of the navigation system of FIG. 1 showing a warning about potential bicycle traffic according to the embodiment described in connection with FIG. 8.

FIG. 11 illustrates the display of the navigation system showing a warning about bicycle traffic according to the embodiment of the bicycle warning application described in connection with FIG. 10.

FIG. 13 illustrates the display of the navigation system showing a warning about bicycle traffic according to another embodiment described in connection with FIG. 12.

DETAILED DESCRIPTION OF THE PRESENTLY PREFERRED EMBODIMENTS

I. Exemplary Navigation System Platform

A. Overview

Figure 1:
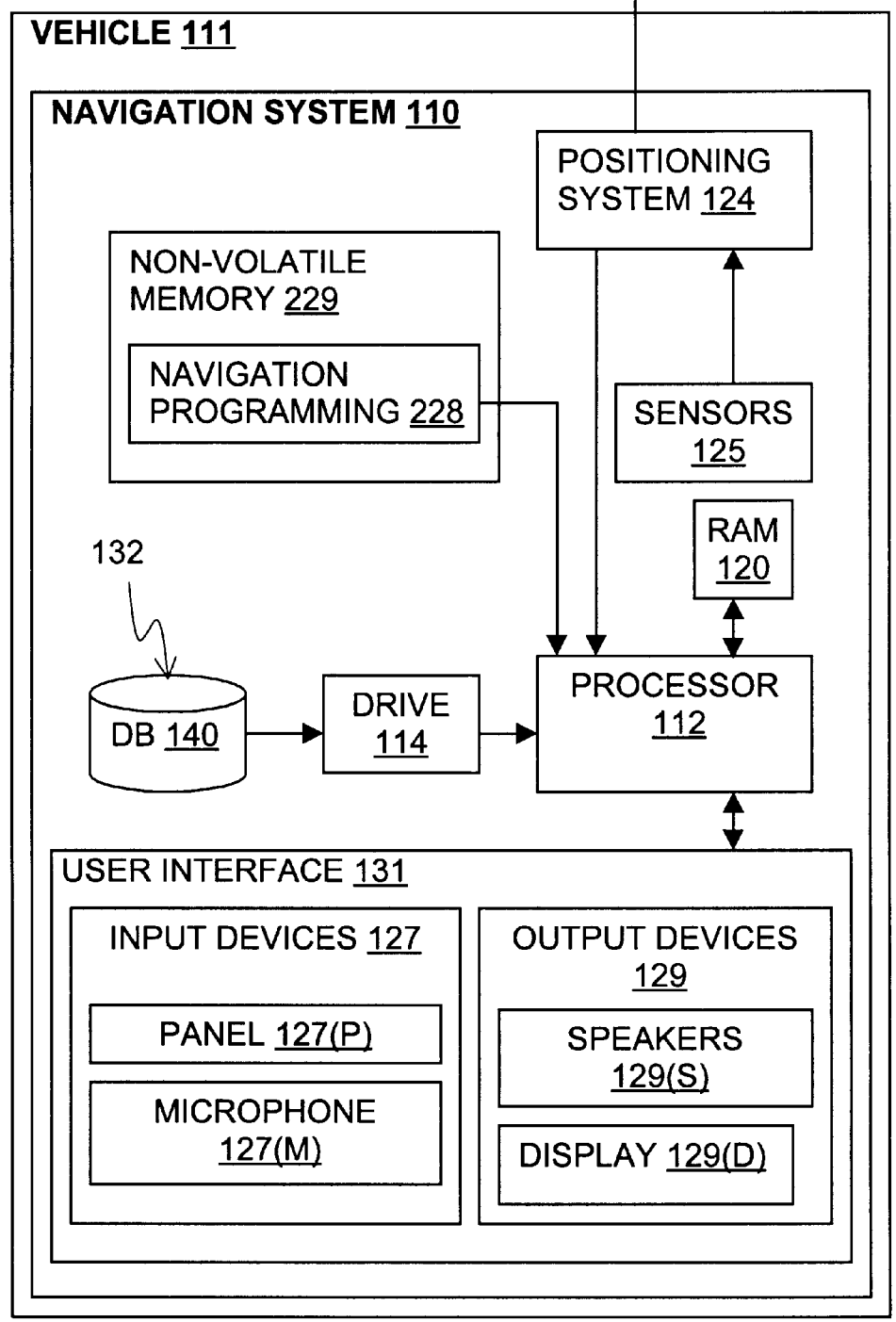
FIG. 1 is a block diagram illustrating a navigation system.

Referring to FIG. 1, there is a diagram illustrating an exemplary embodiment of a navigation system 110. The navigation system 110 may be stationary or portable. In the embodiment shown in FIG. 1, the navigation system 110 is a portable system located in a vehicle 111, such as an automobile, truck, or bus. In other embodiments, the navigation system 110 may be installed in other platforms, as explained below.

The navigation system 110 is a combination of hardware and software components. The hardware components of the navigation system 110 may include a processor 112, memory 120, and so on. In the embodiment of FIG. 1, the navigation system 110 also includes a positioning system 124 that determines the position of the vehicle 111 in which it is installed. The positioning system 124 may include sensors 125 or other components that sense the speed, orientation, direction, and so on, of the vehicle 111. The positioning system 124 may also include a GPS system.

The navigation system 110 also includes a user interface 131. The user interface 131 includes appropriate means 127 for receiving instructions and/or input from an end user of the navigation system. The instruction receiving means 127 may include a keyboard, keypad, or other type of input panel 127(P), a microphone 127(M), as well as other means for accepting end-user input, such as voice recognition software, and so on, through which the end user may request navigation information and services. The user interface 131 also includes appropriate means 129 for providing information back to the end user. The information providing means 129 may include a display 129(D) and speakers 129(S) (including speech synthesis hardware and software) through which the end user can be provided with information and services from the navigation system 110.

All of the components described above may be conventional (or other than conventional) and the manufacture and use of these components are known to those of skill in the art. For example, the processor 112 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable.

B. The Geographic Database

In order to provide navigation features to an end user, the navigation system 110 uses geographic data 140. The geographic data 140 includes information about one or more geographic regions or coverage areas. The geographic data 140 may be stored in the vehicle 111 or alternatively, the geographic data 140 may be stored remotely and made available to the navigation system 110 in the vehicle 111 through a wireless communication system which may be part of the navigation system 110. In another alternative, a portion of the geographic data 140 may be stored in the vehicle 111 and a portion of the geographic data 140 may be stored in a remote location and made available to the navigation system 110 in the vehicle 111 over a wireless communication system from the remote location.

In the embodiment shown in FIG. 1, some or all of the geographic data 140 are stored on a medium 132 which is located in the vehicle 111. Accordingly, the navigation system 110 includes a drive 114 (or other suitable peripheral device) into which the medium 132 can be installed and accessed. In one embodiment, the storage medium 132 is a CD-ROM disk. In another alternative embodiment, the storage medium 132 may be a PCMCIA card in which case the drive 114 would be substituted with a PCMCIA slot. Various other storage media may be used, including fixed or hard disks, DVD disks or other currently available storage media, as well as storage media that may be developed in the future.

The geographic data 140 may take a variety of different forms. In one embodiment, the geographic data 140 is in the form of one or more computer-readable data files or databases. The geographic database includes data specifying the positions of the roads in the covered geographic region(s). The geographic database also includes data relating to the roads, such as restrictions on directions of travel along the roads (e.g., one-way streets), street addresses along the roads, street names, speed limits along the roads, turn restrictions at intersections, and so on. The geographic data 140 may also include information about points of interest in the geographic area, such as hotels, restaurants, museums, stadiums, offices, automobile dealerships, auto repair shops, etc. The geographic data 140 may also include information about places, such as cities, towns, or other communities. The geographic database 140 may include other kinds of data about the geographic area.

In one embodiment, the geographic database contains a plurality of road segment data entities. Each road segment data entity represents a portion (or segment) of a navigable road in the geographic region. In one type of geographic database, there is at least one database entry (also referred to as "entity" or "record") for each represented road segment in a geographic region. Each physical road segment has two nodes associated with it, one at each of the endpoints of the road segment. In this embodiment, the geographic data 140 also includes a plurality of data entities that represent these nodes. (The terms "segment" and "node" represent only one terminology for describing these physical geographic features and other terminology for these features is intended to be encompassed within the scope of these concepts.)

Data attributes are associated with each road segment data record to describe features or characteristics of the represented road segment. The various attributes associated with a road segment may be included in a single road segment record, or may be included in more than one type of record which are cross-referenced to each other.

FIG. 2 illustrates some of the components of a road segment data entity 222 included in the geographic data 140. The road segment entity 222 includes a segment ID 222(1) by which the record can be identified in the geographic database.

The road segment data entity 222 may also include data 222(3) that indicates the maximum permitted vehicular speed of travel on the represented road segment record. The road segment data entity 222 may also include data 222(4) indicating whether the represented road segment is part of a controlled access road (such as an expressway), a ramp to a controlled access road, a bridge, a tunnel, a toll road, a ferry, and so on. The road segment data entity 222 may also include data 222(5) that indicates a rank of the represented road segment. (A rank of a road segment may correspond to its functional class. For example, road segments having a rank of "4" may include high volume, controlled access roads, such as expressways and freeways. Road segments having a rank of "3" may be high volume roads with few speed changes, but are not necessarily controlled access roads. The lower ranked roads handle corresponding lower volumes and generally have more speed changes or slower speeds. Road segments having a rank of "0" can handle the lowest volumes. For example, these may include side streets, alleyways, etc.)

The road segment data entity 222 also includes data, 222(8)(1)(1) and 222(8)(2)(1), identifying the endpoints of the road segment. In one embodiment, these data, 222(8)(1)(1) and 222(8)(2)(1), include references to node data entities 223(1) and 223(2) defined for the nodes corresponding to the endpoints of the represented road segment. By convention, each road segment is considered to have a "left" node and a "right" node. The left node may be the node having greater longitudinal coordinates, or in the case in which the longitudinal coordinates are the same, the node having the lesser latitude. (Of course, which node is defined as the left or right node can be alternatively defined.) Each node data entity 223 includes data, 223(l)(1) or 223(2)(1), identifying the geographic coordinates (e.g., the latitude, longitude, and optionally altitude) of the represented endpoint.

Also associated with the road segment data entity 222 are data 222(8)(1)(2) and 222(8)(2)(2) indicating valid successor segments (if any) at each of the endpoints of the represented road segment. A valid successor segment is a road segment to which vehicular travel is legally permitted from the represented road segment. Also associated with the road segment data entity 222 are data 222(8)(1)(3) and 222(8)(2)(3) indicating invalid successor segments (if any) at each of the endpoints of the represented road segment. An invalid successor segment is a road segment to which vehicular travel is not legally permitted from the represented road segment.

The road segment data entity 222 may also include data 222(2) that indicate which direction on the represented road segment each of a plurality of different types of vehicles (or non-vehicles) are legally permitted to travel. For example, with respect to automobile traffic 222(2)(1), there are two data fields, labeled "L/R" and "R/L." These data fields are used to indicate whether automobile traffic is permitted on the represented road segment in the direction from the left node to the right node of the segment and from the right node to the left node, respectively. Each of these data fields, "L/R" and "R/L", may be represented with a single bit. As shown in FIG. 2, there may be separate data fields for trucks, 222(2)(2), bicycles 222(2)(3), pedestrians 222(2((4), and so on. In addition, there may be separate data fields for weight classes of trucks. There may also be separate fields for motorcycles, horses, skaters, etc.

The embodiment of the road segment data record 222 shown in FIG. 2 includes bicycle lane/path location data 222(7). These bicycle lane/path location data 222(7) are discussed below.

The road segment record 222 may also include or be associated with other data 222(6) that include or refer to various other attributes of the represented road segment, such as the street address range along the represented road segment, the name of the road of which the represented road segment is a part, the highway designation of the road of which the road segment is a part, and so on.

In one embodiment, the geographic data are provided by Navigation Technologies Corporation of Rosemont, Ill. However it is understood that the inventive concepts disclosed herein are not restricted to any particular source of data.

C. The Navigation Programming.

Referring again to FIG. 1, in addition to the hardware components and geographic database, the navigation system 110 includes or uses navigation programming 228. The navigation programming 228 includes the software that provides for the functions and/or features performed by the navigation system 110. The navigation programming 228 uses the geographic data 140 in conjunction with input from the end user via the user interface 131, and possibly in conjunction with outputs from the positioning system 124, to provide various navigation-related features and/or functions.

The navigation programming 228 may be stored in a non-volatile storage medium 229 in the navigation system 110. Alternatively, the navigation programming 228 and the geographic data 140 may be stored together on a single storage device or medium. Alternatively, the navigation programming 228 may be located at a remote location and may be provided to or accessed by the navigation system 110 over a communications system.

In one embodiment, the navigation programming 228 is written in the C programming language although in alternative embodiments other programming languages may be used, such as C++, Java, Visual Basic, and so on.

Figure 3:
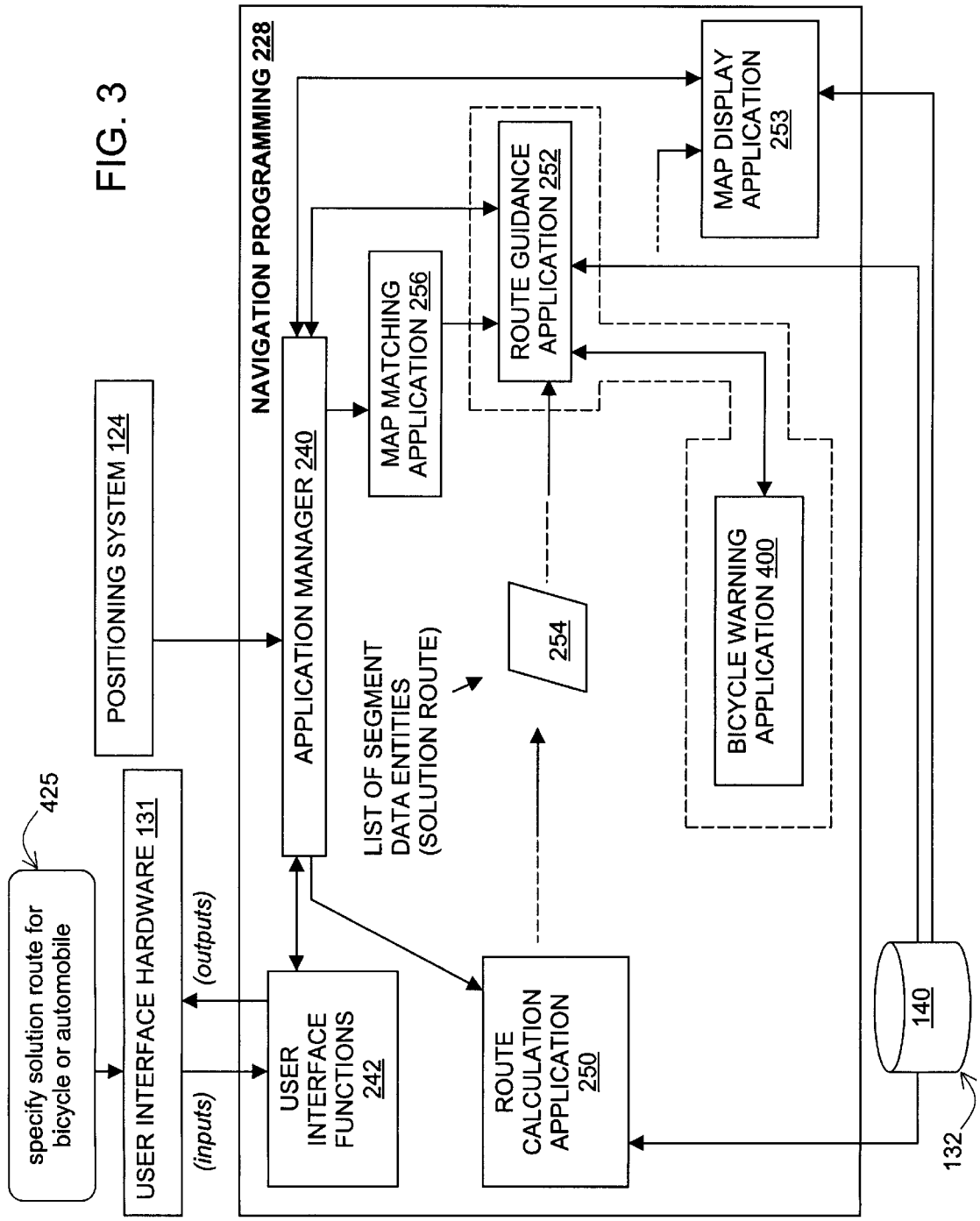
FIG. 3 is a block diagram illustrating components of the navigation programming shown in FIG. 1.

The navigation programming 228 may be formed of separate component applications (also referred to as programs, subprograms, routines, or tools). The component applications of the navigation programming 228 work together through defined programming interfaces. FIG. 3 shows a block diagram illustrating some of the component applications for one embodiment of the navigation programming 228 included in the navigation system 110 of FIG. 1. In addition to the component programs shown in FIG. 3, the navigation programming 228 may include other component sub-routines or programs.

In FIG. 3, the navigation programming 228 is shown to include a navigation application manager 240. The navigation application manager 240 is a program or routine that provides for overall management of the functions of the navigation system 110. The navigation application manager 240 may also include support for and interfaces to the navigation system hardware, such as the positioning system 124 and the user interface 131. The navigation application manager 240 includes user interface functions 242 to interface with the user interface hardware 131. These user interface functions 242 may provide for presenting a menu to the end user on the screen display 129(D) of the user interface hardware 131, accepting inputs from the end user via the input devices 127 of the user interface hardware 131, displaying results to the end user on the screen display 129(D) of the user interface hardware 131, and so on.

The navigation programming 228 includes sub-programs or routines that interface with the navigation application manager 240 and that provide for specific navigation-related features or functions to be performed by the navigation system. These sub-programs include a route calculation application 250, a route guidance application 252, a map display application 253, and a map matching function 256. The navigation programming 228 may include navigation applications in addition to these.

The route calculation application 250 receives a request to calculate a route to a desired destination. The request may be in the form of an identification of a starting location and a desired destination location. The identification of these locations may include the geographic coordinates of these locations. The route calculation application may also be provided with other data or parameters, such as driving preferences (e.g., avoid toll roads). Given at least the identification of a starting location and a desired destination location, the route calculation application 250 attempts to determine one or more solution routes between the starting location and the destination location. A solution route is formed of a series of connected road segments over which a vehicle can travel from the starting location to the destination location. When the route calculation application 250 calculates a route, it accesses the geographic data 140 and obtains road segment data entities 222 that represent road segments around and between the starting location and the destination location. The road calculation application 250 uses the information in the road segment data entities 222 to attempt to determine at least one valid solution route from the starting location to the destination location. In determining a valid solution route for a vehicle to travel, the route calculation program 250 uses the data attributes associated with the road segment data entities to account for direction of travel restrictions (e.g., one-way streets), turn restrictions at intersections (e.g., no left turns), and so on. The route calculation application 250 may attempt to find a solution route that takes the least time to travel, that covers the least distance, or that meets some other specifiable criteria.

The route calculation application 250 may use various means or algorithms in determining solution routes. Methods for route calculation are disclosed in Ser. No. 09/047, 698, Mar. 25, 1998, the entire disclosure of which is incorporated by reference herein. (The methods disclosed in the aforementioned patent application represent only some of the ways that routes can be calculated and the subject matter claimed herein is not limited to any particular method of route calculation. Any suitable route calculation method now known or developed in the future may be employed.)

The route calculation application 250 provides an output. In the embodiment of FIG. 3, the output of the route calculation application 250 is in form of an ordered list 254 identifying a plurality of road segments. The plurality of road segments form the continuous navigable route between the origin and the destination that had been calculated by the route calculation application 250. (The route calculation application 250 may calculate more than one solution route.)

The list 254 of road segments determined by the route calculation application 250 is provided to the route guidance application 252. The route guidance application 252 uses the information in the list 254, as well as additional information from the geographic database 140, to provide instructions and advice to the end user to travel the route defined by the list 254 output by the route calculation application 250. The route guidance application 252 may include functions that identify locations along the calculated route at which maneuvering instructions may be provided to the end user. The route guidance application 252 may also include functions that formulate the maneuvering instructions for visual output and/or audio output. The route guidance application 252 may provide the maneuvering instructions all at once, or alternatively, the route guidance application 252 may provide the maneuvering instructions one at a time as the vehicle is traveling. In one embodiment, each maneuvering instruction is provided separately (or in small groups of combined maneuvering instructions) in advance of when the specific maneuver is required to be taken so that the end user can prepare to make the required maneuver.

In order to provide maneuvering instructions at appropriate times and/or locations, the navigation system 110 uses data from the positioning system 124. The positioning system 124 determines the position of the vehicle as it is traveling. The map-matching application 256 in the navigation programming 228 compares the vehicle position determined by the positioning system 124 to the positions of the road segments in the solution driving route 254. Using this comparison, the maneuver instructions, which are related to positions along the solution route, can be provided at appropriates times as these positions are approached.

The route guidance application 252 may also provide the end user with information about the remaining distance to the destination location. The navigation application manager 240 and the route guidance application 252 may also use the outputs from the positioning system 124 and the map-matching application 256 for this purpose.

The list 254 of road segments from the route calculation application 250 may also be provided to the map display application 253. The map display application 253 uses the information in the list 254, as well as additional information from the geographic database 140, to provide graphical maps on the display (129(D) in FIG. 1) of the user interface 131. The graphical maps illustrate the areas through which the calculated route passes. The path of the calculated route may be highlighted on the displayed maps. The map display application 253 interfaces with the navigation application manager 240 so that the display maps are provided as the vehicle is traveling the calculated route. The navigation application manager 240 and the map display application 253 may receive the outputs from the positioning system 124 and the map-matching application 256 for this purpose.

II. Including Bicycle Data in Geographic Database

As mentioned above, navigation systems can be very useful, providing end users with helpful navigation-related information. End users may enjoy even greater advantages with one or more of the embodiments disclosed herein. According to some of the disclosed embodiments, navigation systems (or navigation applications installed on other platforms) are augmented or enhanced by providing guidance about the presence of bicycle traffic so that vehicle drivers can take extra precautions. Further according to some of the disclosed embodiments, navigation systems (or navigation applications installed on other platforms) are augmented or enhanced by providing navigation-related features, such as route calculation and route guidance, for travel by bicycle.

These features are provided in part by data included in the geographic database 140. Referring again to FIG. 2, bicycle data 222(2)(3) and 222(7) are included in some or all the data records that represent road segments. According to one embodiment, the bicycle data 222(2)(3) and 222(7) include several component items of information. (In alternative embodiments, there may be more or fewer than these items of information.)

A first component of the bicycle data includes the bicycle permitted direction attributes 222(2)(3). The bicycle permitted direction attributes 222(2)(3) are used to indicate whether the represented road segment permits bicycle traffic and which directions along the road segment bicycle traffic is permitted.

The bicycle data includes the bicycle location left-to-right attribute 222(7) "L/R" and the bicycle location right-to-left attribute 222(7) "R/L." These attributes 222(7) "L/R" and 222(7) "R/L" are used when a bicycle lane is located parallel to a lane of a road segment used by motorized vehicles. These attributes 222(7) "L/R" and 222(7) "R/L" are used to indicate on which side of a road segment the bicycle lane is located. (The explanation provided herein applies to geographic databases that represent road segments in countries in which motorized vehicles travel on the right-hand side of the road. In countries in which motorized vehicles travel on the left-hand side of the road, appropriate modifications would be made.)

A bicycle lane that is parallel to a motor vehicle lane of a road segment is assumed to be located to the right of all the motor vehicle lanes of the road, i.e., toward the shoulder and away from the centerline of the road. The bicycle location left-to-right attribute 222(7) "L/R" is used to indicate that a bicycle lane is located along the side of the road segment to the right of the vehicle lanes (if any) that permit vehicle from the left node to the right node. Similarly, the bicycle location right-to-left attribute 222(7) "R/L" is used to indicate that a bicycle lane is located along the side of the road segment to the right of the vehicle lanes (if any) that permit vehicle from the right node to the left node. The attributes 222(7) "L/R" and 222(7) "R/L" are used to define the locations of bicycle lanes without regard to whether vehicular traffic is legally permitted in the direction relative to which the location of the bicycle lane is defined. The bicycle location left-to-right attribute 222(7) "L/R" is used to define the relative location of a bicycle lane even if the represented road segment is a one way street in which the direction of vehicular traffic is restricted to the direction from the right node to the left node. Likewise, the bicycle location right-to-left attribute 222(7) "R/L" is used to define the relative location of a bicycle lane even if the represented road segment is a one way street in which the direction of vehicular traffic is restricted to the direction from the left node to the right node.

Note that the bicycle permitted direction attributes 222(2)3) and 222(7) may be independent of each other. If bicycle traffic is legally permitted along a road in a particular direction, even if the road does not have a separate lane or path exclusively for bicycles, the bicycle permitted direction attribute 222(2)(3) is set to indicate that bicycle traffic is allowed for that direction. If no separate lane exclusively for bicycle traffic is present, the bicycle location attribute 222(7) would be set to negative even if bicycle traffic is permitted along the road for that direction (as indicated by the bicycle permitted direction attribute 222(2)(3).

Use of the bicycle data 222(2)(3) and 222(7) to represent roads that include bicycle lanes is illustrated in connection with FIGS. 4A–4D. FIGS. 4A–4D show four different road configurations with bicycle lanes. (These four different road configurations are only examples and it should be understood that embodiments of the inventive subject matter disclosed herein may be used in many more different kinds of road configurations.)

Figure 4A:
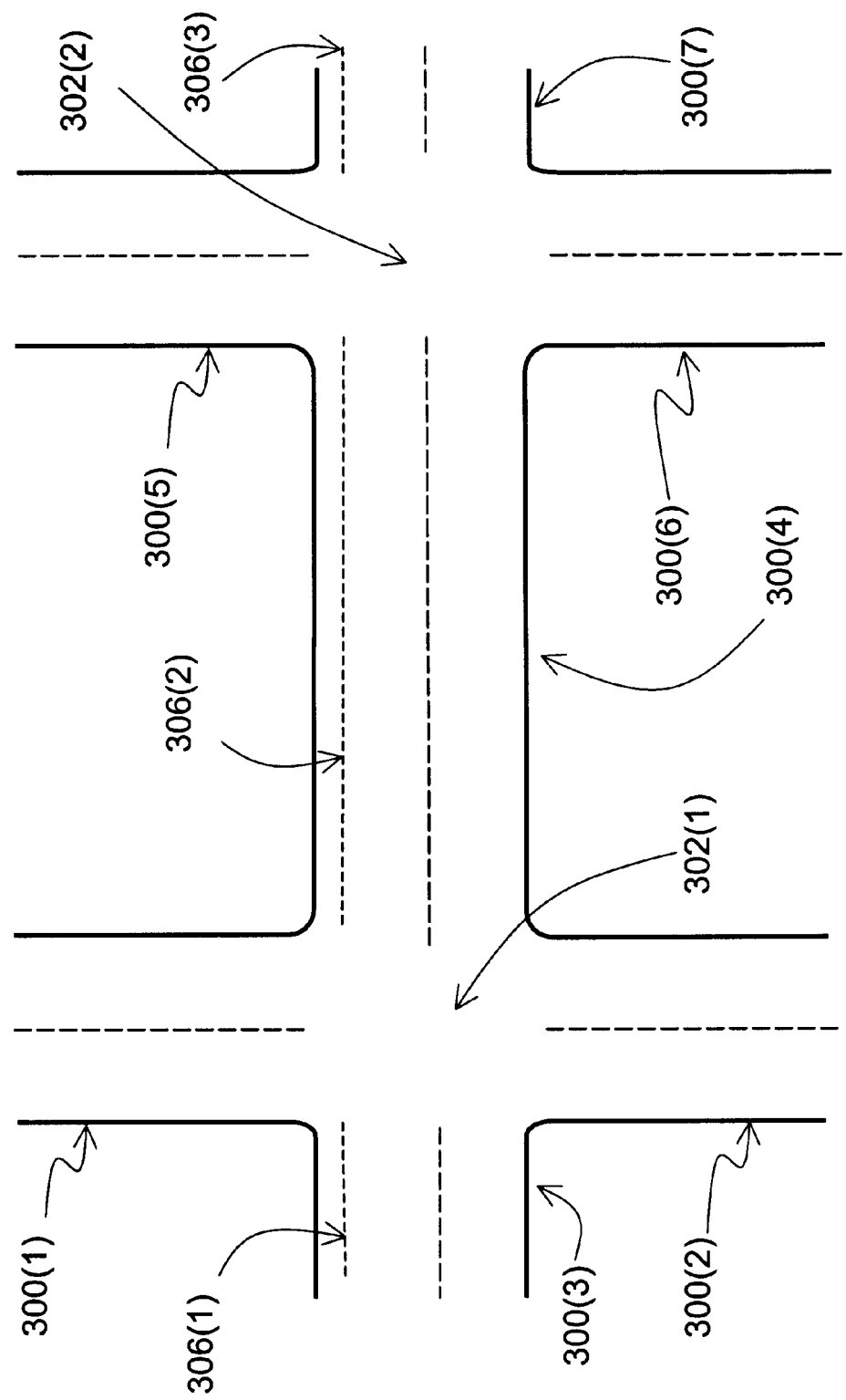

FIG. 4A shows road segments 300(1), 300(2), 300(3), 300(4), 300(5), 300(6), and 300(7), and intersections 302(1) and 302(2). Located along the road segments 300(3), 300(4), and 300(6) are bicycle lanes 306(1), 306(2), and 306(3). In the road configuration shown in FIG. 4A, the bicycle lanes 306(1), 306(2), and 306(3), are formed of portions of the road segments 300(3), 300(4), and 300(6). In the geographic database 140, each of the road segments 300(1), 300(2), 300(3), 300(4), 300(5), 300(6), and 300(7) is represented by a road segment data entity (similar to the entity 222 shown in FIG. 2). The road segment data entities 222 that represent the road segments 300(3), 300(4), and 300(7) include data attributes that indicate that a bicycle lane is associated with the represented road segment. For example, in the data record 222 that represents the road segment 300(4), the permitted bicycle direction attribute 222(2)(3) "R/L" is set, indicating that the road segment represented by the data entity permits bicycle traffic from the right node to the left node. (Note that motorized vehicle traffic is also permitted along the road segment 300(4) so the attributes 222(2)(1) "L/R" and "R/L" (for autos) and possibly 222(2)(2) "L/R" and "R/L" (for trucks) are also set. The bicycle location left-to-right attribute 222(7) "L/R" is not set, indicating that the road segment represented by the data entity does not include a bicycle lane to the right of the lane(s) for motorized vehicles extending from the left node 302(1) to the right node 302(2). The bicycle location right-to-left attribute 222(7) "R/L" is set, indicating that the road segment represented by the data entity includes a bicycle lane to the right of the lane(s) for motorized vehicles from the right node 302(2) to the left node 302(1). The bicycle data attributes 222(2)(3) and 222(7) for the data entities that represent the road segments 300(3) and 300(7) would be similarly set.

Figure 4B:
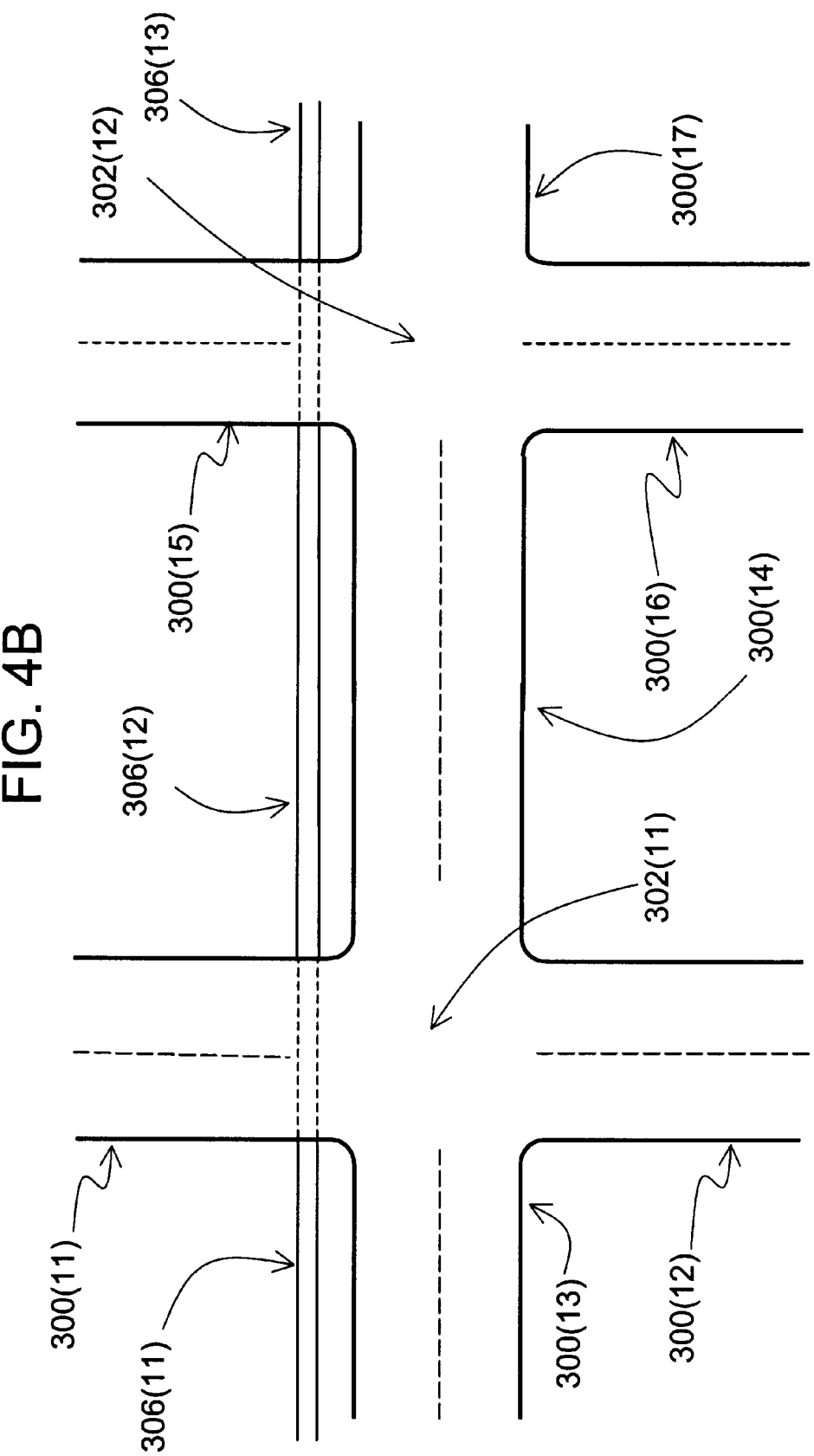

FIG. 4B shows another configuration of road segments including a bicycle lane. FIG. 4B shows road segments 300(11), 300(12), 300(13), 300(14), 300(15), 300(16), and 300(17), and intersections 302(11) and 302(12). Located along the road segments 300(1), 300(4), and 300(6) are bicycle lanes 306(11), 306(12), and 306(13). In the road configuration shown in FIG. 4B, the bicycle lanes 306(11), 306(12), and 306(13), are separate road segments that are located close to but physically apart from the road segments 300(13), 300(14), and 300(17). (In the embodiment shown in FIG. 4B, two-way bicycle traffic is permitted on the bicycle path 306(11), 306(12, and 306(13).)

As stated above, each of the road segments 300(11), 300(12), 300(13), 300(14), 300(15), 300(16), and 300(17) is represented by a road segment data entity in the geographic database 140. Even though the bicycle lanes 306(11), 306 (12), and 306(13) are located separate from the road segments 300(13), 300(14), and 300(17), they are relatively close to these road segments, e.g., within the right-of-way of the road segments. Thus, these bicycle lanes are represented as parts of the respective road segments along which they located. Accordingly, the road segment data entities 222 that represent the road segments 300(13), 300(14), and 300(17) include data attributes that indicate that a bicycle lane is associated with the represented road segment. For example, in the data record 222 that represents the road segment 300(14), the permitted bicycle direction attributes 222(2)(3) "L/R" and "R/L" are set indicating bicycle traffic is permitted along the road segment from the left node to the right node and from the right node to the left node. The bicycle location left-to-right attribute 222(7) "L/R" is not set, but the bicycle location right-to-left attribute 222(7) "R/L" is set, indicating that the road segment represented by the data entity includes a bicycle lane to the right of the lane(s) for motorized vehicles from the right node 302(12) to the left node 302(11). The bicycle data attributes 222(2)(3) and 222(7) for the data entities that represent the road segments 300(13) and 300(17) would be similarly set.

FIG. 4C shows another configuration of road segments including bicycle lanes. FIG. 4C shows road segments 300(21), 300(22), 300(23), 300(24), 300(25), 300(26), and 300(27), and intersections 302(21) and 302(22). Located along the road segments 300(23), 300(24), and 300(27) are bicycle lanes 306(21), 306(22), 306(23), 306(24), 306(25), and 306(26). In the road configuration shown in FIG. 4C, the bicycle lanes are located on both sides of the road segments 300(23), 300(24), and 300(27). The road segment data entities 222 that represent the road segments 300(23), 300 (24), and 300(27) include data attributes that indicate that a bicycle lane is associated with the represented road segment. For example, in the data record 222 that represents the road segment 300(24), the permitted bicycle direction attributes 222(2)(3) "L/R" and "R/L" are set indicating that bicycle traffic is permitted from the left node to the right node and from the right node to the left node. The bicycle location left-to-right attribute 222(7) "L/R" is set, indicating that the road segment represented by the data entity includes a bicycle lane to the right of the lane(s) for motorized vehicles from the left node 302(21) to the right node 302(22). Likewise, the bicycle location right-to-left attribute 222(7) "R/L" is set, indicating that the road segment represented by the data entity includes a bicycle lane to the right of the lane(s) for motorized vehicles from the right node 302(22) to the left node 302(21). The bicycle data attributes 222(2)(3) and 222(7) for the data entities that represent the road segments 300(23) and 300(27) would be similarly set.

FIG. 4D shows another configuration of road segments including bicycle lanes. FIG. 4D shows road segments 300(31), 300(32), 300(33), 300(34), 300(35), 300(36), 300 (37), and 300(38), and intersections 302(31) and 302(33). A bicycle path, formed of segments 306(1) and 306(2), crosses the road segments 300(34) and 300(35) forming the intersection 302(32). Separate road segment data entities are included in the geographic database 140 to represent the segments, 306(1) and 306(2), that form the bicycle path. In the road configuration shown in FIG. 4D, the bicycle lanes are not associated with any particular road segments on which motorized vehicle traffic is permitted. In the data entities that represent these bicycle path road segments, the bicycle permitted direction attributes 222(2)(3) "L/R" and "R/L" are set, indicating that the road segment represented by the data entity allows bicycle traffic in both directions. The motorized vehicle attributes 222(2)(1) and 222(2)(2) are not set for these data entities since the represented road segments do not have lanes for motorized vehicle traffic.

The foregoing represents one way that data about bicycle paths can be included in the geographic database. Other arrangements and other kinds of data about bicycles may be included.

III. Using Bicycle Data in Navigation Systems

A. Bicycle Route Calculation and Guidance.

According to one embodiment, a navigation system can provide an end user with route calculation and route guidance for traveling to a desired destination by bicycle. According to this embodiment, the navigation system uses a geographic database that includes bicycle data, such as the geographic database described in connection with FIGS. 2 and 4A–4D.

There are several ways that a navigation system can be used to provide navigation-related features for travel by bicycle. For example, some navigation systems are portable and can be carried by the user. With a portable navigation system, the user can operate the navigation system to calculate a route. Then, after the route has been calculated, the portable navigation system can be carried by the user while riding a bicycle along the calculated route. The portable navigation system may include mounting hardware so that it can be mounted on the bicycle. Alternatively, the portable navigation system may be strapped or otherwise fastened to the body of the bicyclist. Alternatively, the portable navigation system may be carried in a knapsack, a bicycle carrier, etc. The navigation system may provide guidance for following the route while the bicyclist is traveling along the calculated route. The guidance may be in the form of maneuvering instructions to follow the calculated route. The guidance may also include other kinds of advice. The guidance may be in visual or audio form.

Figure 5:
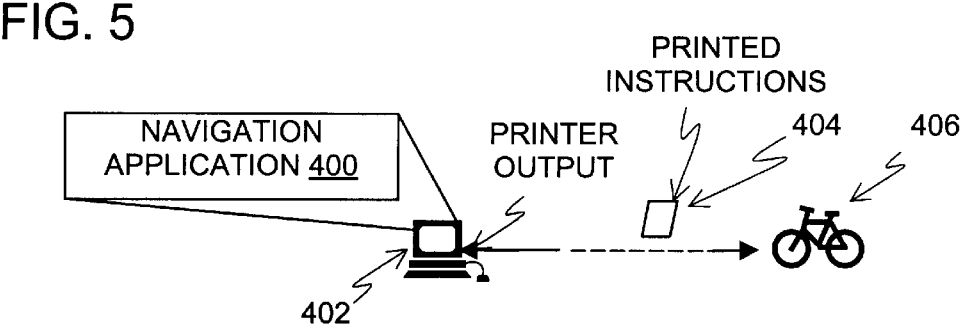
FIG. 5 is an illustration of an embodiment for providing route guidance for a bicycle using a navigation application installed on a personal computer.

Another way that a navigation system that can be used to provide navigation-related features for traveling a route by bicycle is have the navigation system provide an output that is then carried by the user as the route is ridden by bicycle. FIG. 5 shows one example illustrating this embodiment. In FIG. 5, a navigation application program 400 is run on a personal computer 402. (The navigation application program 400 may be similar or identical to the navigation programming 228, described above.) The navigation application program 400 is used to calculate a bicycle route to a destination. Then, guidance 404 for following the calculated route is printed out and carried by the bicyclist 406 as the route is being driven. The guidance 404 can take the form of printed instructions describing the maneuvers to be taken while riding the route or can include one or more maps that show the bicycle route highlighted.

Figure 6:
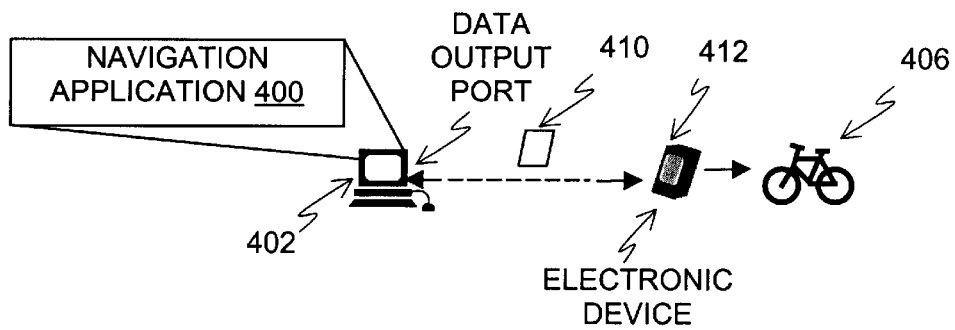
FIG. 6 is an illustration of another embodiment for providing route guidance for a bicycle using a navigation application installed on a personal computer.

In another alternative shown in FIG. 6, the navigation application 400 provides a data output 410 that is transmitted into a portable electronic device 412 which is then carried by the bicyclist 406 as the route is being ridden. The bicyclist 406 can then obtain route guidance from the portable electronic device 412. The portable electronic device 412 may be a portable personal computer, a personal digital assistant, a PalmPilot®-type device, a portable navigation device, etc.

Figure 7:
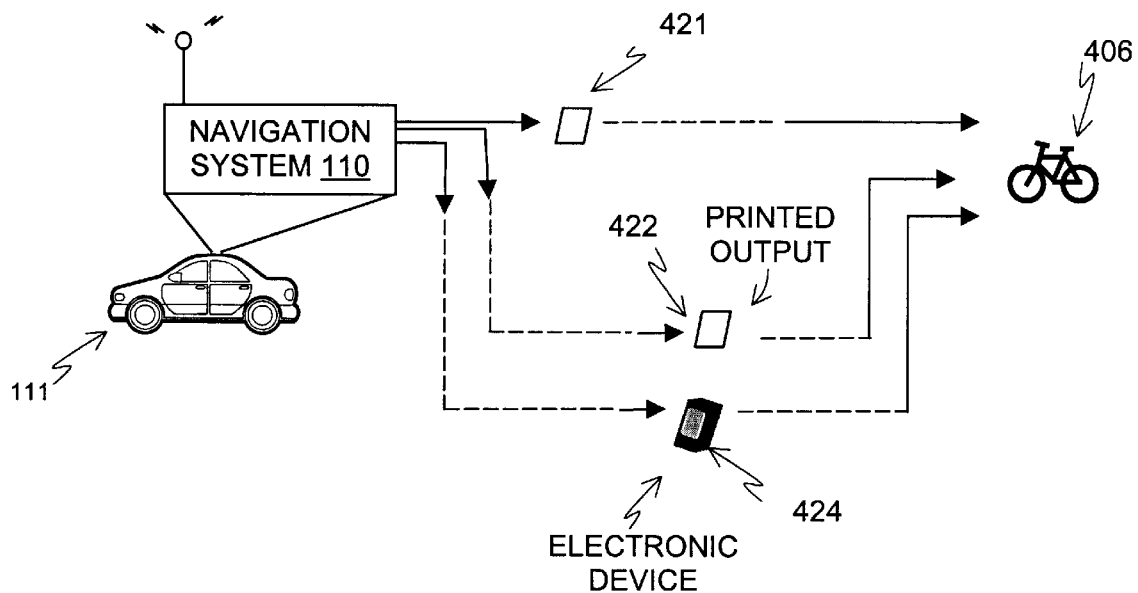
FIG. 7 is an illustration of an embodiment for providing route guidance for a bicycle using a navigation system.

A navigation system installed in a vehicle can also be used to provide route calculation and route guidance features for a bicycle route. FIG. 7 is a diagram showing an example of this embodiment. A user who wishes to travel by bicycle operates the in-vehicle navigation system 110 to calculate a bicycle route. Then, after the in-vehicle navigation system 110 has calculated the bicycle route, the user may copy the route guidance by hand 421, obtain a printed output 422 of the route guidance, or transmit the route guidance data to a portable electronic device 424. Alternatively, the user may review the route guidance on the display 129(D) of the navigation system and commit it to memory.

There are other ways in addition to those described above in which a navigation system or navigation application can be used to provide navigation-related functions for traveling by bicycle.

When a navigation system is used calculate a bicycle route, several considerations apply. For example, when a bicycle route is requested, the end user may provide input indicating that the route is going to be traveled by bicycle. Referring to FIG. 3, an input 425 is provided to the navigation system 110 by the end user indicating that the route is going to be traveled by bicycle. The user can provide this input 425 using an input or setup menu provided by the user interface 131.

After the user has requested a bicycle route to a destination, the route calculation application 150 determines a solution route. The route calculation application 250 operates in a manner similar to the manner in which it operates when a route for a motorized vehicle is determined with the following differences. First, when determining a solution route for a bicycle, road segments that are "bicycle only" can be used in the solution route. "Bicycle only" roads are those roads in which the data fields for permitted motorized vehicle traffic, e.g., 222(2)(1) and 222(2)(2) in FIG. 2, are set to negative and at least one of the data fields for permitted bicycle traffic direction, e.g., 222(2)(3), is set on.

Another difference that occurs in the route calculation application when determining a bicycle route relates to controlled access roads. If data 222(4) in a record that represents a road segment indicates that the represented road segment is part of a controlled access road (e.g., an expressway), the represented road segment is not used in a solution route for a bicycle. (Note that a controlled access road segment may be represented by a data entity 222 in which the permitted bicycle direction of travel attributes 222(2)(3) "L/R" and "R/L" are both set to negative.)

Another difference that may apply relates to valid and invalid successors. Because bicyclists can dismount and walk their bicycles across intersections, turn restrictions at intersections may not apply. Accordingly, when determining a solution route for a bicycle, invalid successors (222(8)(3)(1) and 222(8)(3)(2)) as well as valid successors (222(8)(3)(1) and 222(8)(3)(2)) of a segment may be used in a solution route.

Another difference that applies when calculating a solution route for travel by bicycle is that the bicycle is assumed to travel at a speed appropriate for a bicycle regardless of the posted vehicle speed limit. Thus, the speed category or speed limit attribute (222(3) in FIG. 2) may not be used (except as noted below) when determining which road segments to include in a solution route for a bicycle because a bicycle is assumed to travel at the same speed along any road segment regardless of the posted vehicle speed. Accordingly, when determining a solution route for a bicycle, the shortest route may be determined as the best route.

Although speed limits along roads may not be used to determine which road segments provide the fastest travel times for travel by bicycle, data about the speed limits along roads may be used to suppress high speed roads from consideration in a solution route for travel by bicycle. This feature is preferably optional and may be specified by the user. As mentioned above in connection with FIG. 2, in the geographic database, the data representing a road segment includes an attribute, e.g., 222(3), that indicates a permitted vehicle speed along the represented road segment. This attribute may include the actual speed limit or a speed category that defines ranges of speed limits. If the user specifies that high speed roads should not be used when calculating a bicycle route, road segments having high speed limits, e.g., 45 miles per hour or above, are not used in a solution route for a bicycle unless there is no other way to get to the destination.

Another factor that can be considered when determining a solution route for travel by bicycle is altitude. Bicycle travel may be assumed to be affected by changes in altitude. By contrast, motorized vehicles may be assumed to be relatively unaffected by changes in altitude. As mentioned above, in a geographic database, the data that represent roads and other geographic features may include attributes that indicate the geographic positions of the represented features, including latitude, longitude and optionally altitude. Using the information in the geographic database about altitudes of geographic features, a solution route for travel by bicycle can be determined that minimizes changes in altitude (e.g., minimizes hills) or avoids abrupt increases in altitude (e.g., avoids steep hills), etc. Alternatively, hilly roads may be preferred for exercise purposes and the route calculation function can be configured to favor such routes.

Other differences in addition to those mentioned above may apply to the determination of a solution route for a bicycle. After the solution route for the bicycle is determined, guidance for following the calculated solution route is provided to the user in any of the ways described above.

B. Bicycle Warnings While Driving

According to another aspect of a disclosed embodiment, a navigation system installed in a motorized vehicle can provide guidance to the vehicle driver that includes warnings about bicycle traffic around the vehicle. As mentioned above, an in-vehicle navigation system can be used to provide guidance for following a calculated route. The guidance may take the form of visual or audio instructions that identify the maneuvers to be taken to drive the calculated route. These instructions may be provided as the route is being driven. In one embodiment, the output of the positioning system (124 in FIG. 1) determines the position of the vehicle in the geographic area. From this information, the position of the vehicle along the calculated route can be determined using the map matching application (256 in FIG. 3). Then, the maneuvering instructions can be provided in advance of when the maneuver has to be made by the driver. Thus, the driver can readily follow the maneuvering instructions to drive the calculated route.

The guidance provided by the navigation system while the route is being driven may include information in addition to maneuvering instructions. The additional information may be provided for the interest of the driver. For example, when the vehicle passes a municipal boundary, the navigation system may provide the driver with a notification about the boundary crossing (e.g., "ENTERING WISCONSIN"). Similarly, the navigation system may provide guidance informing the driver when a point of interest is being passed.

According to an embodiment, the navigation system provides the driver with information about potential and/or actual bicycle traffic. This information is provided for safety purposes. The information can be used by the driver to look out for bicycles, to slow down, honk, etc.

Referring to FIG. 3, the information about bicycle traffic is provided by a bicycle warning application 400. The bicycle warning application 400 is part of the navigation programming 228 of the navigation system 110. The bicycle warning application 400 may be part of the route guidance application 252 or may be provided as a separate application.

When providing information about bicycles, the bicycle warning application 400 uses the bicycle data (222(2)(3) and 222(7) in FIG. 2) in the geographic database 140 to determine when a bicycle traffic warning should be provided. Using the output from the positioning system 124 and the calculated route 254, the bicycle warning application 400 can provide a warning when the path of the vehicle is about to cross a bicycle lane. Situations in which the navigation system provides warnings are described in the following examples.

EXAMPLE 1

Figure 8:
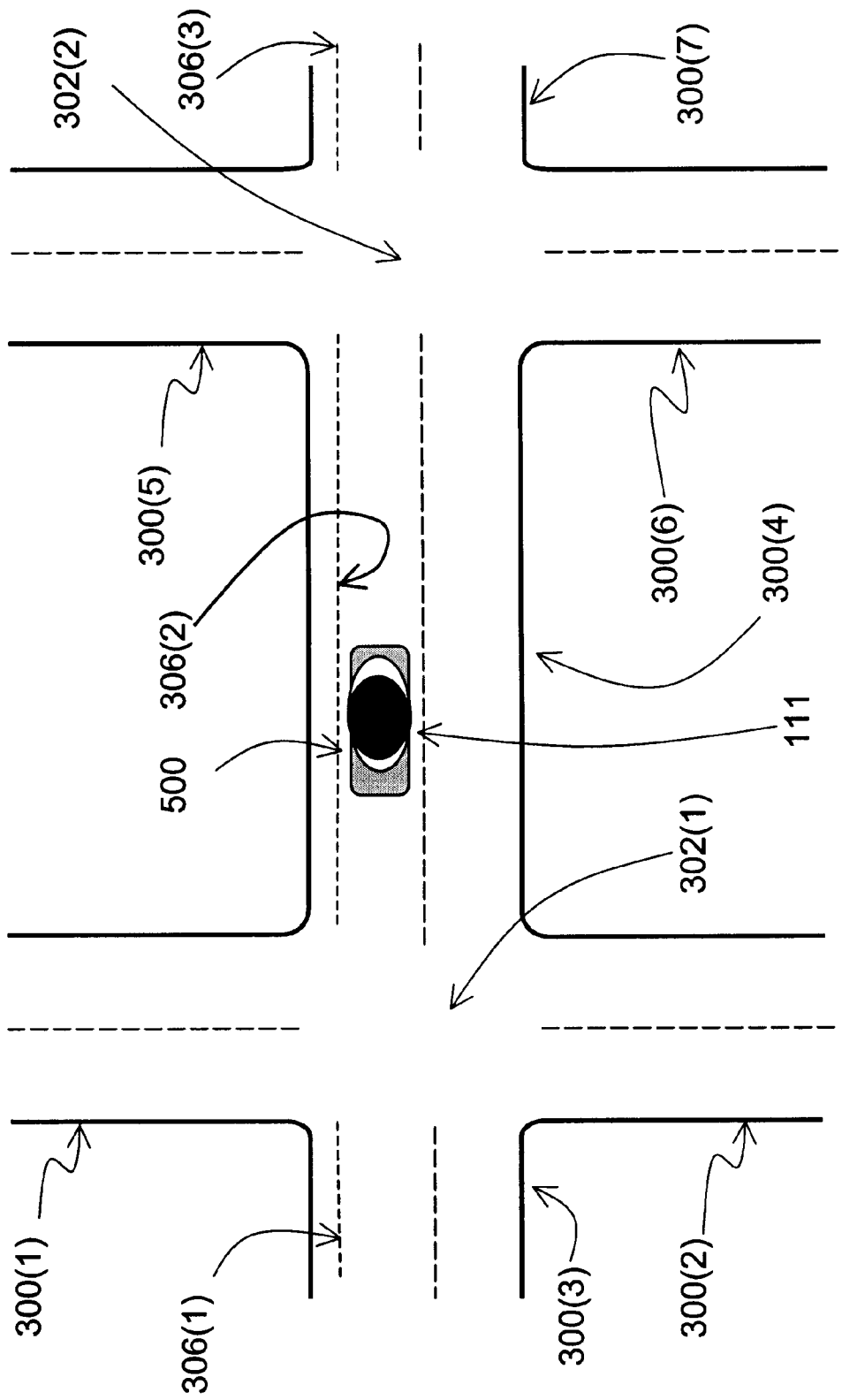
FIG. 8 illustrates a road configuration for which a warning may be provided according to an embodiment of the bicycle warning application shown in FIG. 3.

A first example is described in connection with FIG. 8. FIG. 8 shows the same road configuration illustrated in FIG.

4A. In FIG. 8, the vehicle 111 is located at a position 500 on the segment labeled 300(4) traveling westbound toward the intersection labeled 302(1). The vehicle 111 is following a route calculated by the navigation system installed in the vehicle 111. The calculated route calls for making a right turn at the intersection 302(1) from the segment 300(4) onto the segment labeled 300(1). As the vehicle 111 approaches the intersection 302(1), the navigation system installed in the vehicle 111 provides route guidance in the form of a maneuvering instruction that informs the driver to make a right turn at the upcoming intersection onto the segment 300(1). According to a present embodiment, in conjunction with providing the route guidance for making the right turn, the navigation system 110 also provides a warning to the driver informing him/her that the vehicle will be crossing a bicycle lane immediately when turning onto the segment 300(1). This warning may be provided visually on the display screen 129(D) and/or as an audible warning over the speaker 129(S). An example of a warning 502 provided on the display 129(D) of the navigation system 110 is shown in FIG. 9.

EXAMPLE 2

According to another embodiment, a warning about crossing a bicycle lane may be provided by the bicycle warning application 400 (of FIG. 3) even if the vehicle 111 is not following a calculated route. If the vehicle is not following a calculated route, warnings about bicycle traffic are based upon the present vehicle location (as determined by the positioning system 124 and the map matching application 256) and the vehicle heading. An example illustrating this embodiment is shown in FIG. 10.

Figure 10:
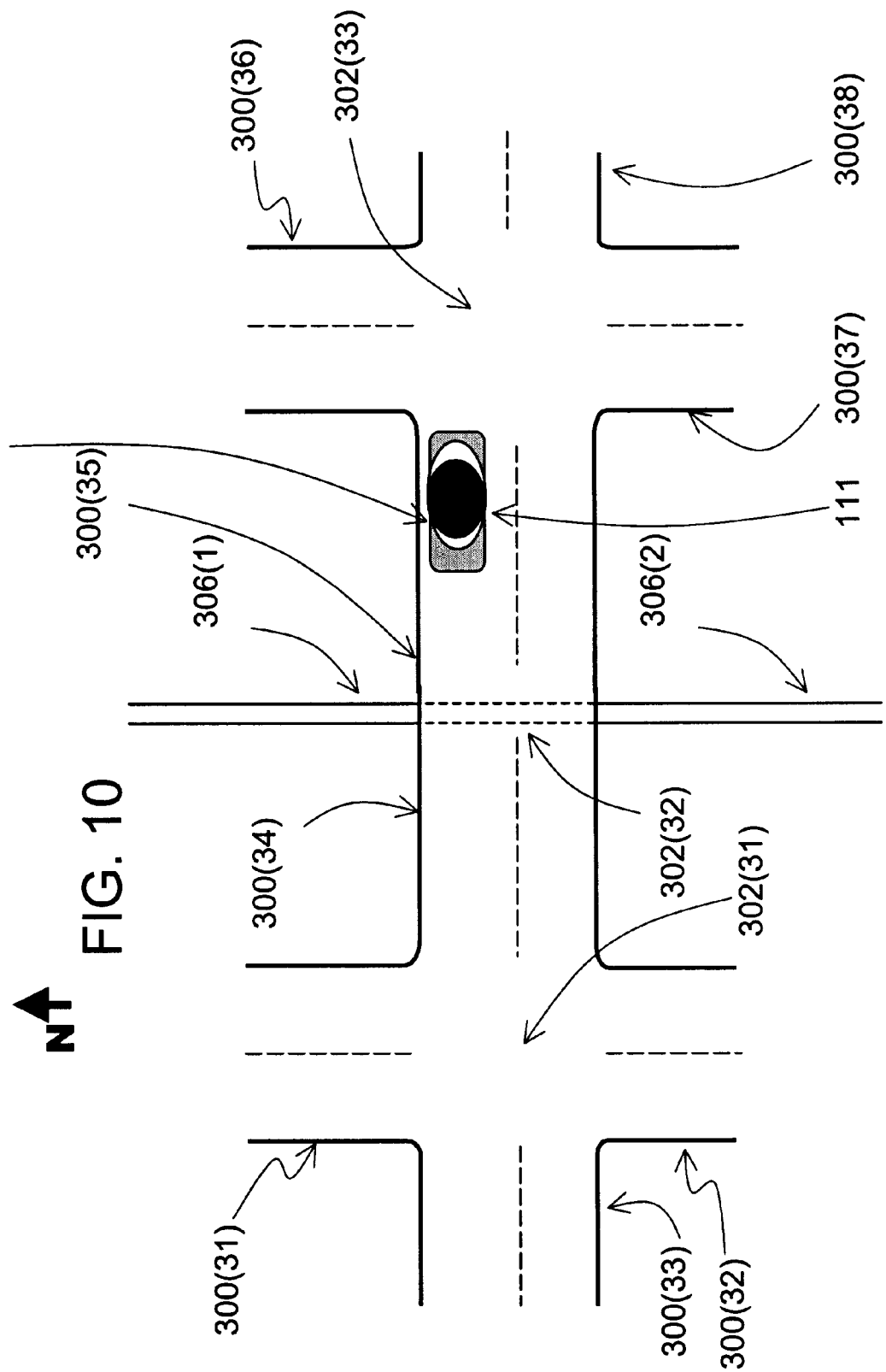
FIG. 10 illustrates another road configuration for which a bicycle warning may be provided according to the embodiment of the bicycle warning application shown in FIG. 3.

FIG. 10 shows the same road configuration illustrated in FIG. 4D. In FIG. 10, the vehicle 111 is located at a position 510 on the segment labeled 300(35) traveling westbound. The vehicle 111 is not following a route calculated by the navigation system installed in the vehicle 111. However, using the positioning system 124 and the map matching application 256, the bicycle warning application 400 determines that the vehicle is approaching a bicycle path crossing. Accordingly, the bicycle warning application 400 causes a warning to be provided to the driver as the location of the bicycle path crossing at 302(32) is approached. This warning may be provided visually on the display screen 129(D) and/or as an audible warning over the speaker 129(S). An example of a warning 512 provided on the display 129(D) of the navigation system 110 is shown in FIG. 11.

According to a further aspect of this embodiment, if a driver indicates an intention to turn, such as by turning on the vehicle's directional signal, the bicycle warning application 400 immediately evaluates the bicycle lane location data 222(7) associated with the segment upon which the vehicle is traveling to determine whether a bicycle lane is located along the segment in the direction indicated by the vehicle's directional signal. If the data 222(7) indicate the presence of a bicycle lane in the signaled direction, the bicycle warning application 400 causes a warning, to be provided to the driver. The warning may be similar to the warnings shown in FIGS. 9 and 11.

EXAMPLE 3

Figure 12:
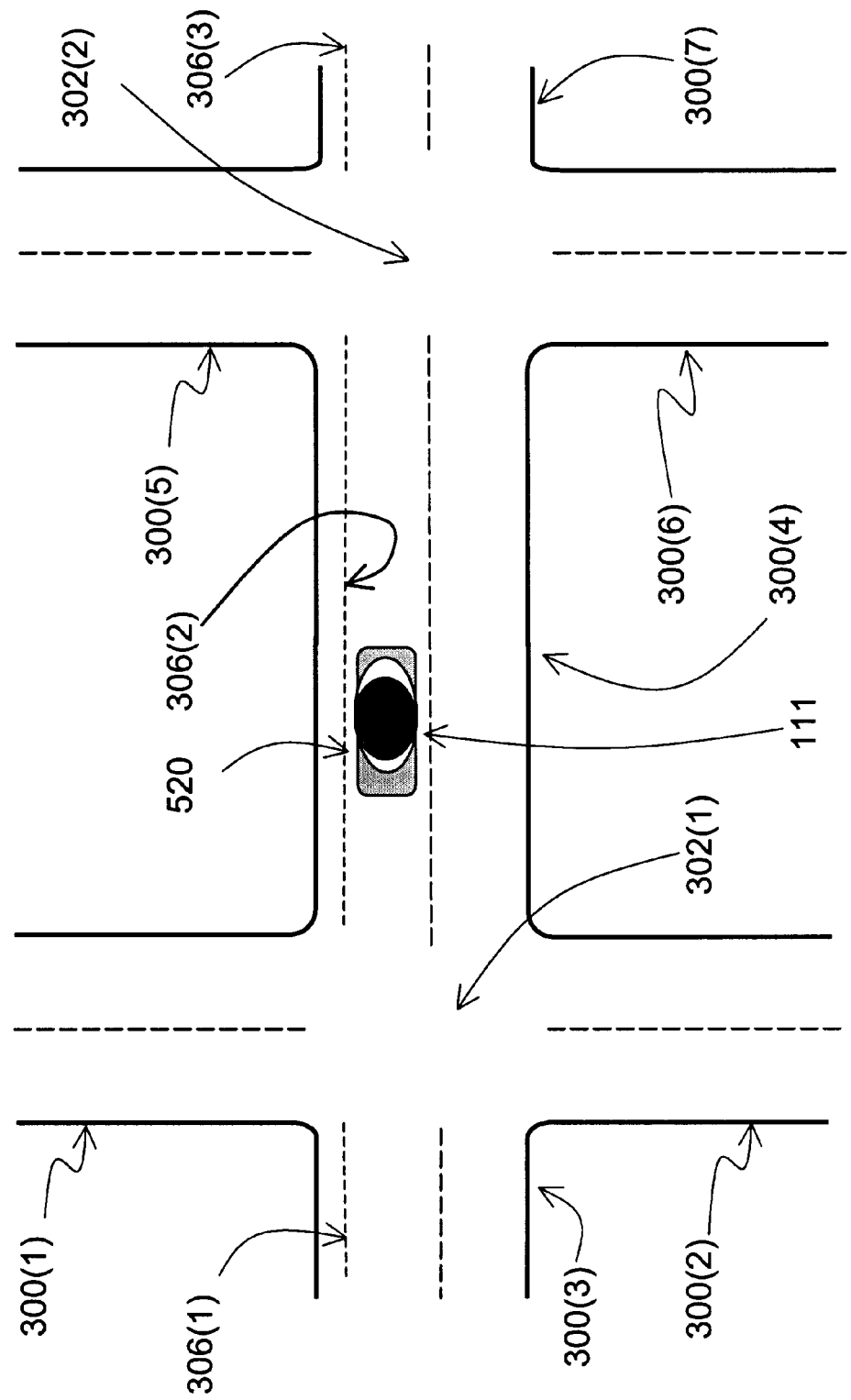
FIG. 12 illustrates another road configuration for which a bicycle warning may be provided according to the embodiment of the bicycle warning application shown in FIG. 3.
Figure 14:
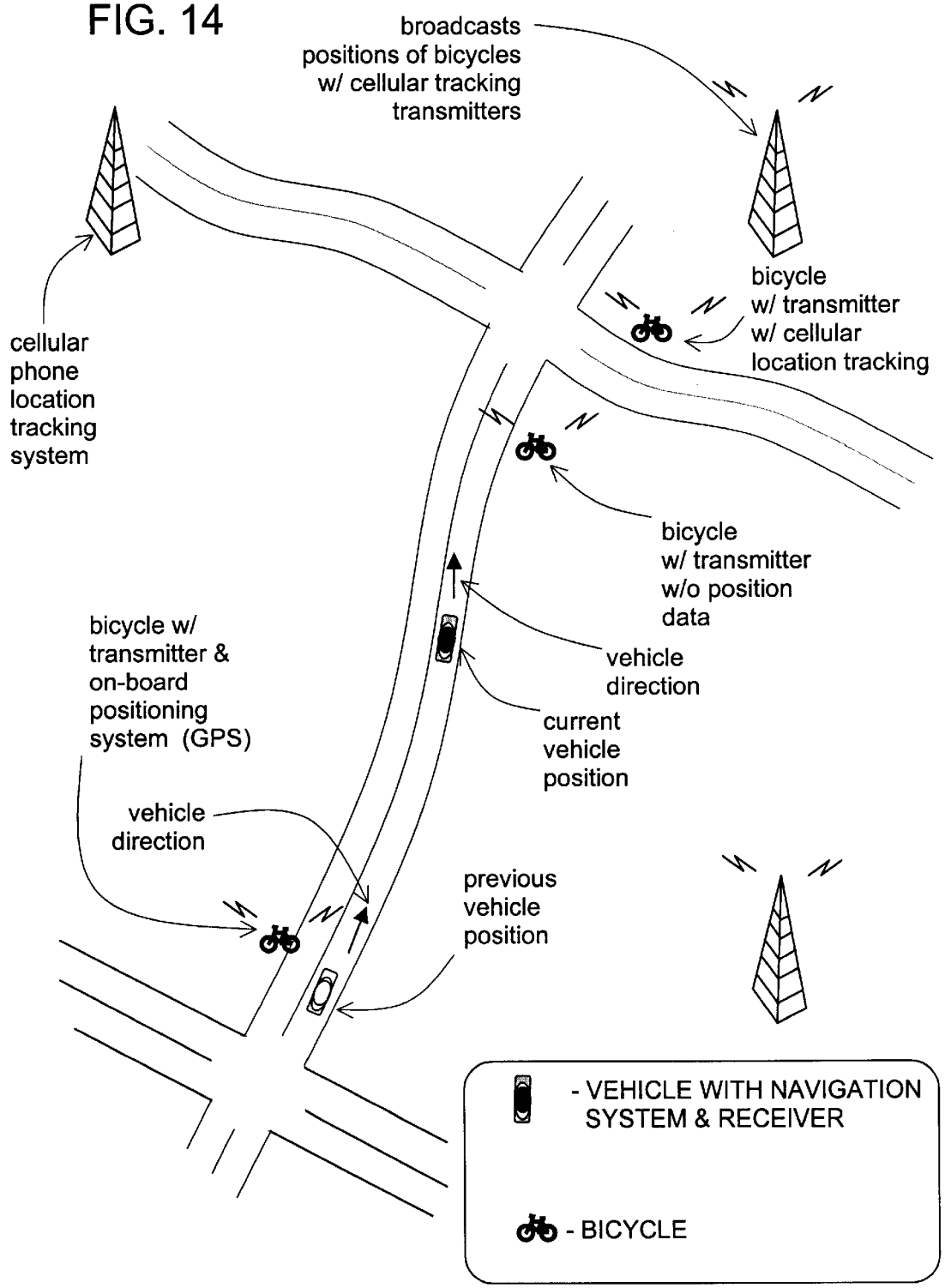
FIG. 14 illustrates another embodiment of a system for providing warning about bicycle traffic around a vehicle equipped with a navigation system.

According to another embodiment, warnings about bicycle traffic may be provided by the bicycle warning application 400 even if the vehicle path is not going to cross a bicycle path. According to this embodiment, warnings may be provided when the vehicle is close to a bicycle path. An example illustrating this embodiment is shown in FIG. 12. FIG. 12 shows the same road configuration illustrated in FIG. 4A and FIG. 8. In FIG. 12, the vehicle 111 is located at a position 520 on the segment labeled 300(4) traveling westbound. The vehicle 111 is following a route calculated by the navigation system installed in the vehicle 111. The calculated route calls for continuing straight at the intersection 302(1) from the segment 300(4) onto the segment labeled 300(3). According to a present embodiment, the bicycle warning application 400 provides a warning to the driver informing him/her that the vehicle is traveling next to a bicycle path. This warning may be provided visually on the display screen 129(D) or as an audible warning over the speaker 129(S). An example of a warning 522 provided on the display 129(D) of the navigation system 110 is shown in FIG. 13. This warning 522 may be provided periodically while vehicle is traveling next to a bicycle path.

C. Alternative Embodiment for Providing Warnings While Driving

According to another embodiment, an electronic device, such as a navigation system located or installed in a motorized vehicle, can provide warnings about objects actually located in the vicinity around the vehicle. The electronic device located or installed in the vehicle can provide these warnings using wireless transmissions from the objects. Included among the types of objects about which warnings can be provided are any slow-moving vehicles or objects, any fast-moving vehicles or objects, or any stationary vehicles or objects. For example, slow-moving vehicles may include bicycles, joggers, wide load trailers, etc. Fast moving vehicles may include ambulances, police cars, and other emergency vehicles. Stationary objects include stopped vehicles, construction sites, etc. An implementation of this alternative embodiment in connection with bicycle traffic is described below.

According to this embodiment, bicycles are equipped with transmitters. These transmitters send signals on a regular basis, such as every 5 seconds, every 10 seconds, etc. These signals may be relatively low powered so that they are transmitted over only a limited area. These signals may include information, such as the instantaneous geographic position of the bicycle. (Optionally, the signal may also include a bicycle ID or other data.) To provide information such as the geographic position, a transmitter on a bicycle may be coupled to or include a positioning system, such as a GPS system. Alternatively, the signals that are output by the transmitter on the bicycle may provide only an indication of the presence of a bicycle and not include any information indicating the geographic position.

The vehicle includes equipment that can receive signals transmitted directly from the bicycle transmitters or signals derived from the signals transmitted by the bicycle transmitters. Upon receiving the signals, the equipment in the vehicle provides a warning to the vehicle driver about the presence of bicycles in the vicinity of the vehicle. If the signals received by the equipment in the vehicle include information about the positions of the bicycles, the warning provided to the vehicle driver can include information about the bicycle locations. In one embodiment, the equipment in the vehicle that receives the signals about bicycles located around the vehicle and/or that provides the warnings to the driver is part of or coupled to an in-vehicle navigation system. If bicycle position information is available, the position of the bicycle relative to the vehicle can be indicated by the in-vehicle navigation system. For example, the position of the bicycle can be displayed on a map on a display screen of the navigation system. If the bicycle location relative to the vehicle location and heading is such that there is little or no likelihood of an accident, the warning may be suppressed. Alternatively, those bicycles that are located outside of an area along a path ahead of the vehicle can be shown in one color (e.g., green) and those bicycles located along the path ahead of the vehicle can be shown in a different color (e.g., red).

As mentioned above, some bicycles may only transmit signals indicating their presence and not their location. For these bicycles, a separate means of determining the location of the bicycle may used. For example, since the vehicle is usually moving relatively rapidly compared to the bicycle, the position of the bicycle can be determined using triangulation. The vehicle may include appropriate equipment for this purpose. (If the vehicle is not moving above a specified speed, e.g., 25 mph, for any reason, such as a traffic jam, operation of the triangulation feature is suspended.) Alternatively, the transmitters on the bicycles can transmit signals that allow them to be located using the systems that are used to locate cellular phone users (or systems similar to such systems). With such systems, a bicycle position can be determined remotely and data indicating the bicycle position is transmitted (e.g., wirelessly) to the vehicle. In the vehicle, the data is received and used in the same manner as described above.

In one embodiment, the transmitters on the bicycles are portable so that they can be carried by the bicyclist from one bicycle to another.

As stated above, in alternative embodiments this warning feature may be used for objects other than bicycles. For example transmitters, like the kinds described above, can be used on joggers, pedestrians, wide load trailers, stopped vehicles, stationary objects, construction sites, motorcycles, ambulances, police cars, and other emergency vehicles.

According to one embodiment described above, the electronic device located in the vehicle that receives these warning signals is a navigation system. In an alternative embodiment, the electronic device may be a radar detector or other type of electronic device capable of receiving the wireless transmissions.

FIG. 18 is an illustration of a bicycle/motorcycle/pedestrian warning system for according this embodiment.

Alternative Embodiments.

In further alternative embodiments, the type of warnings provided by the bicycle warning application 400 may take into account the time of day, ambient light conditions, and weather conditions. For example, warnings about bicycle path crossings may be made more prominently (e.g., louder) in the evening or when lighting or visibility conditions are poor. In still further alternative embodiments, the kinds of warnings provided by the bicycle warning application 400 may be user configurable (e.g., audible, visual, textual, etc.)

It is intended that the foregoing detailed description be regarded as illustrative rather than limiting and that it is understood that the following claims including all equivalents are intended to define the scope of the invention.

We claim:

1. A geographic database used by a vehicle navigation system comprising:
   data representing a first plurality of roads upon which motorized vehicles can travel in a geographic region, wherein the data representing each of said first plurality of roads include
   (1) data indicating geographic coordinates of a represented road of said first plurality of roads; and
   (2) data indicating whether the represented road includes a bicycle lane.

2. The invention of claim 1 further comprising:
   data representing a second plurality of roads upon which only bicycle traffic is permitted, wherein the data representing said second plurality of roads includes geographic coordinates of said second plurality of roads.

3. The invention of claim 1 wherein said geographic database is stored on a computer-readable medium.

4. The invention of claim 1 wherein the data representing each road of said first plurality of roads along which a bicycle lane is located include an indication of which side of the represented road the bicycle lane is located.

5. The invention of claim 4 wherein the indication of which side of the represented road the bicycle lane is located is defined relative to travel along the represented road from one endpoint to the other endpoint.

6. A method implemented with a navigation application program for providing route guidance for traveling to a desired destination by bicycle, the method comprising the steps of:
   accepting an indication by the user of a desired destination;
   determining a solution route to be ridden by bicycle to the desired destination with the navigation application program that uses a geographic database that includes data representing segments of roads in a geographic area, wherein the step of determining a solution route includes the step of:
      evaluating data that represent segments of roads located in the geographic area for inclusion in said solution route, including roads on which both motorized vehicle traffic and bicycle traffic is permitted and roads on which bicycle traffic only is permitted; and
   providing guidance to the user to travel by bicycle via the solution route to the desired destination.

7. The method of claim 6 wherein the step of providing guidance includes printing instructions for following the solution route.

8. The method of claim 6 wherein the step of providing guidance includes transferring data representing said guidance into a portable electronic device.

9. The method of claim 6 wherein said navigation application program is installed in an in-vehicle navigation system installed in a motorized vehicle.

10. The method of claim 6 wherein said step of determining a solution route assumes a rate of travel on said roads consistent with a rate of travel by bicycle regardless of a vehicular speed limit along said roads.

11. The method of claim 6 wherein said step of determining a solution route assumes a uniform rate of travel regardless of a vehicular speed limit along said roads.

12. The method of claim 6 wherein the step of evaluating data further comprises the step of:
   suppressing from consideration for inclusion in said solution route any controlled access roads.

13. The method of claim 6 further comprising:
   prior to the step of determining a solution route, accepting an indication by a user of the navigation application program that a bicycle route is desired, wherein the indication is a selection from a plurality of possible route types, wherein the plurality of possible route types include at least a bicycle route type and a motorized vehicle route type.

14. The method of claim 6 wherein the step of evaluating data further comprises the step of:

suppressing from consideration for inclusion in said solution route any roads from which bicycles are excluded by traffic restrictions.

15. The method of claim 6 wherein the step of evaluating data includes evaluating an altitude change as a factor when determining which roads to include in said solution route.

16. A method implemented with a navigation application program for providing route guidance for traveling to a desired destination by bicycle, the method comprising the steps of:

accepting an indication by the user of a desired destination;

determining a solution route to be ridden by bicycle to the desired destination with the navigation application program that uses a geographic database that includes data representing segments of roads in a geographic area, wherein the step of determining a solution route includes the step of evaluating data that represent segments of roads located in the geographic area for inclusion in said solution route based upon suitability of travel by bicycle thereupon; and providing guidance to the user to travel by bicycle via the solution route to the desired destination.

17. The method of claim 16 wherein the step of providing guidance includes printing instructions for following the solution route.

18. The method of claim 16 wherein the step of providing guidance includes transferring data representing said guidance into a portable electronic device.

19. The method of claim 16 wherein said navigation application program is installed in an in-vehicle navigation system installed in a motorized vehicle.

20. The method of claim 16 wherein said step of determining a solution route assumes a rate of travel on said roads consistent with a rate of travel by bicycle regardless of a vehicular speed limit along said roads.

21. The method of claim 16 wherein said step of determining a solution route assumes a uniform rate of travel regardless of a vehicular speed limit along said roads.

22. The method of claim 16 further comprising:

prior to the step of determining a solution route, accepting an indication by a user of the navigation application program that a bicycle route is desired, wherein the indication is a selection from a plurality of possible route types, wherein the plurality of possible route types include at least a bicycle route type and a motorized vehicle route type.

23. The method of claim 16 wherein the step of determining a solution route further comprises the step of:

evaluating road segments restricted to bicycle traffic only for inclusion in said solution route.

24. The method of claim 23 wherein the road segments restricted to only bicycle traffic are represented by data in said geographic database indicating that said road segments are restricted to only bicycle traffic.

25. A method of providing advice about bicycle traffic to a user of a navigation system installed in a vehicle, the method comprising:

as the vehicle is traveling along a road represented by data in a geographic database used by the navigation system, determining a current position of the vehicle relative to said data; and matching the current position of said vehicle to positions of bicycle lanes represented by said data in said geographic database.

26. The method of claim 25 further comprising:

providing a warning to a driver of said vehicle when said vehicle is close to a bicycle lane.

27. The method of claim 26 further comprising the steps of:

providing route guidance to follow a solution route calculated with said navigation system; and evaluating when an upcoming portion of said solution route crosses said bicycle lane; and wherein the step of providing a warning to the driver of said vehicle is timed to occur as the vehicle approaches the upcoming portion of the solution route that crosses the bicycle lane.

28. The method of claim 26 wherein the warning is provided visually on a display of the navigation system.

29. The method of claim 26 wherein the warning is provided audibly with a speaker.

30. The method of claim 26 wherein the warning is provided when the vehicle is heading toward a crossing with the bicycle lane.

31. The method of claim 30 wherein the crossing with the bicycle lane occurs with an upcoming turning maneuver by the vehicle.

32. The method of claim 26 wherein the warning is provided when the vehicle is traveling adjacent to the bicycle lane.

33. The method of claim 32 wherein warnings are provided periodically as the vehicle is traveling adjacent to the bicycle lane.

* * * * *